US010957009B2

(12) United States Patent
Bang et al.

(10) Patent No.: US 10,957,009 B2
(45) Date of Patent: Mar. 23, 2021

(54) IMAGE PROCESSING APPARATUS AND METHOD

(71) Applicant: Electronics and Telecommunications Research Institute, Daejeon (KR)

(72) Inventors: Gun Bang, Daejeon (KR); Hui Yong Kim, Daejeon (KR); Jin Soo Choi, Daejeon (KR); Jung Won Kang, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 113 days.

(21) Appl. No.: 15/971,467

(22) Filed: May 4, 2018

(65) Prior Publication Data
US 2018/0322611 A1 Nov. 8, 2018

(30) Foreign Application Priority Data
May 4, 2017 (KR) ........................ 10-2017-0057079

(51) Int. Cl.
*G06T 3/00* (2006.01)
*H04N 5/232* (2006.01)
*H04N 13/271* (2018.01)
*H04N 13/243* (2018.01)

(52) U.S. Cl.
CPC .......... *G06T 3/0062* (2013.01); *G06T 3/0037* (2013.01); *G06T 3/0087* (2013.01); *H04N 5/23238* (2013.01); *H04N 13/243* (2018.05); *H04N 13/271* (2018.05)

(58) Field of Classification Search
CPC ... G06T 3/0037; G06T 3/0062; G06T 3/0087; H04N 13/243; H04N 13/271; H04N 5/23238
See application file for complete search history.

(56) References Cited

U.S. PATENT DOCUMENTS

| 5,805,783 | A | * | 9/1998 | Ellson | ..................... G06T 15/20 345/419 |
| 9,185,288 | B2 | | 11/2015 | Ki et al. | |
| 9,384,585 | B2 | | 7/2016 | Kim et al. | |
| 2012/0245877 | A1 | * | 9/2012 | Handa | .................. G01R 33/022 702/95 |
| 2015/0249815 | A1 | | 9/2015 | Sandrew et al. | |
| 2017/0004621 | A1 | * | 1/2017 | Maranzana | ............... G06T 7/66 |
| 2018/0146136 | A1 | * | 5/2018 | Yamamoto | ........... H04N 5/2251 |

FOREIGN PATENT DOCUMENTS

JP 2010097419 A 4/2010

OTHER PUBLICATIONS

Mary-Luc Champel, et al., International Organisation for Standardisation Organisation Internationale De Normalisation ISO/IEC JTC1/SC29/WG11 Coding of Moving Pictures and Audio, "OMAF parallax", Oct. 2016, pp. 1-7, ISO/IEC JTC1/SC29/WG11 MPEG 116/m39282, ChengDu, CN.

* cited by examiner

*Primary Examiner* — Sing-Wai Wu
(74) *Attorney, Agent, or Firm* — William Park & Associates Ltd.

(57) ABSTRACT

Disclosed is an apparatus and method of providing an image processing. An image processing method according to the present disclosure includes: obtaining at least one of image information and depth information of an omni-directional video; and mapping the obtained information to a three-dimensional coordinate system based on a particular three-dimensional figure.

20 Claims, 26 Drawing Sheets

FIG. 1
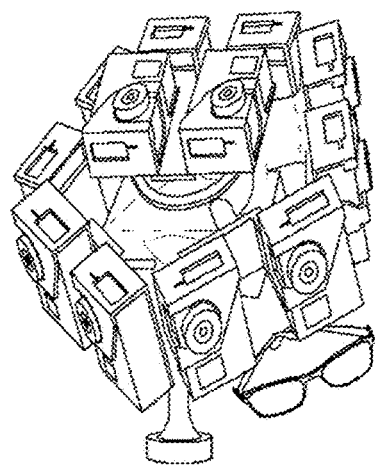
110
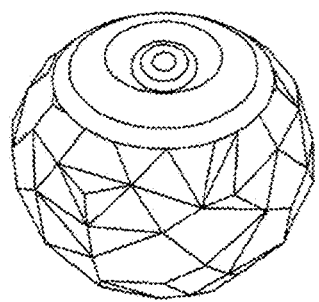
120
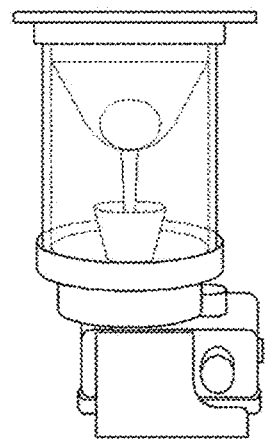
130
FIG. 2
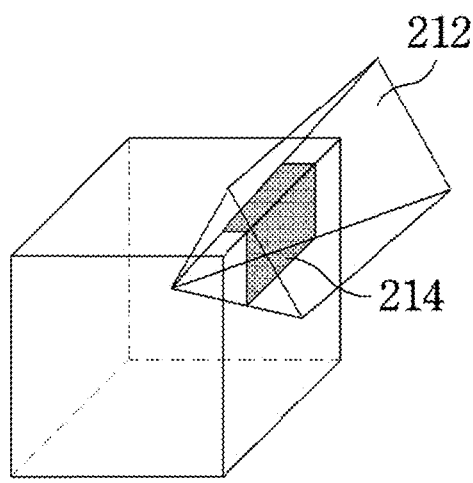
210
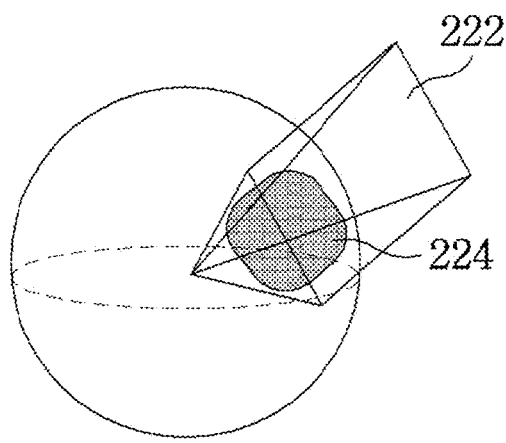
220

FIG. 3
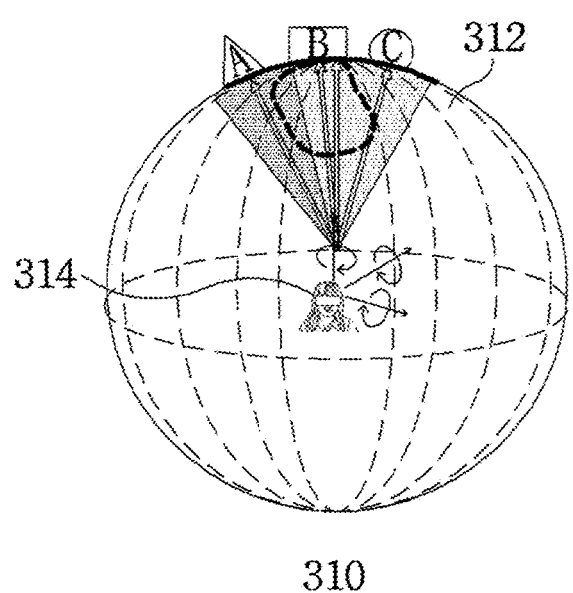
310
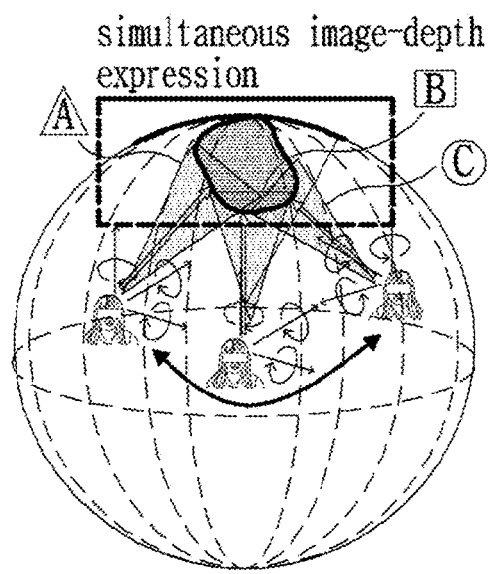
320

FIG. 4
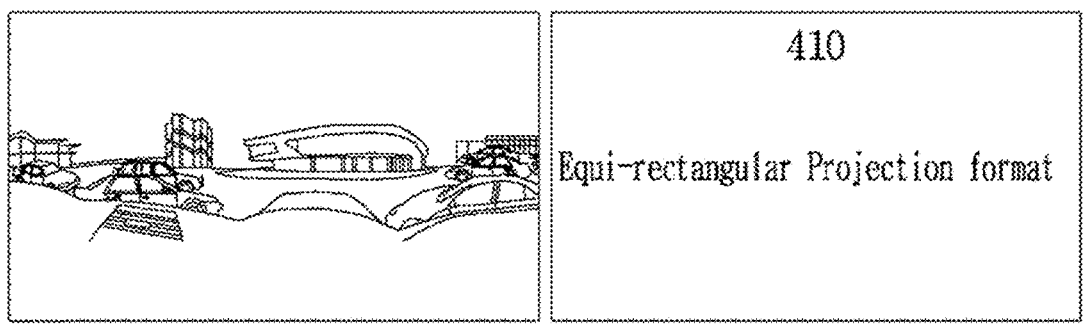
410
Equi-rectangular Projection format
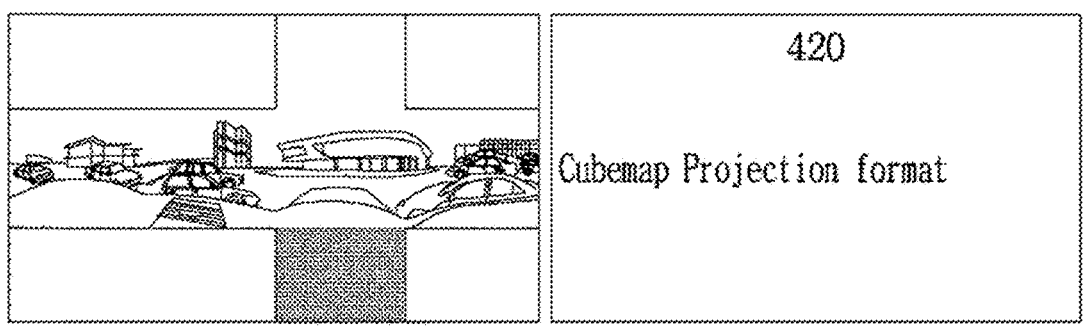
420
Cubemap Projection format
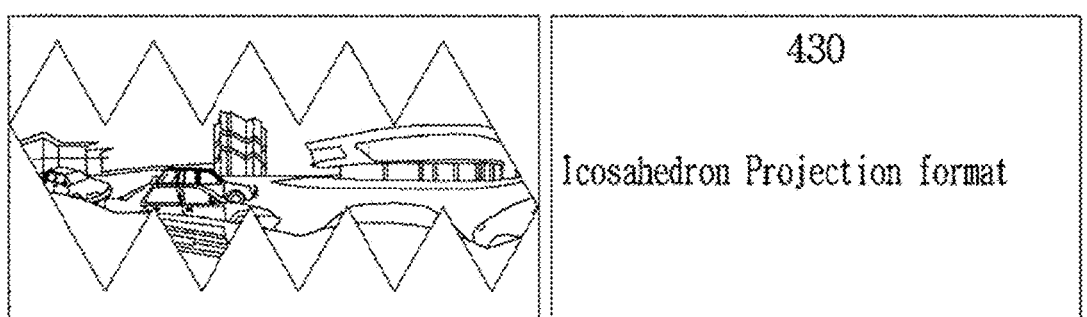
430
Icosahedron Projection format 910  920  930

1010  1020  1030

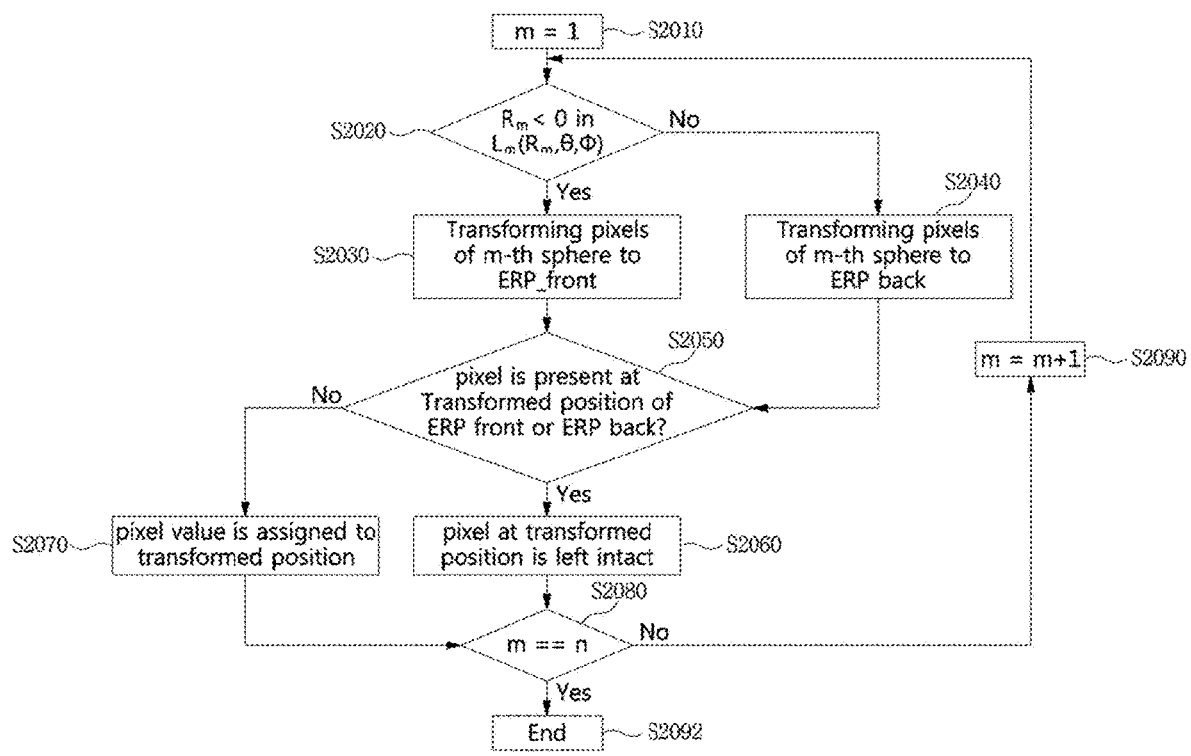

2310　　　　　　　　　　2320

IMAGE PROCESSING APPARATUS AND
METHOD

CROSS REFERENCE TO RELATED
APPLICATION

The present application claims priority to Korean Patent Application No. 10-2017-0057079, filed May 4, 2017, the entire contents of which is incorporated herein for all purposes by this reference.

BACKGROUND OF THE INVENTION

Field of the Invention

The present disclosure relates generally to an image processing apparatus and method for omni-directional videos. More particularly, the present disclosure relates to an apparatus and method of expressing, in three-dimensional space, image information and depth information of an omni-directional video.

Description of the Related Art

A conventional 360-degree video (or omni-directional video) is a video that enables a user to view the video in desired directions beyond a fixed view of a two-dimensional video. FIG. 1 is a diagram illustrating different types of omni-directional cameras for obtaining 360-degree videos according to an embodiment of the present disclosure. FIG. 2 is a diagram illustrating a reproduction space of a 360-degree video provided to the user according to an embodiment of the present disclosure. Referring to FIGS. 1 and 2, in a conventional 360-degree video related technique, multiple cameras 110, a fish-eye lens 120, a reflector 130, etc. are used to film or obtain an image in partial or all directions of 360 degrees from one location. Also, the filmed or obtained image is projected on a polyhedron 210 or a sphere 220 in three-dimensional virtual space, and a region in a direction which the user views may be reproduced on the basis of the image projected on the polyhedron 210 or the sphere 220. For example, an image projected on a region 214 of the polyhedron 210 may be provided to the user where the polyhedron 210 intersects a particular region 212 corresponding to a direction in which the user views. Also, for example, an image projected on a region 224 of the sphere 220 may be provided to the user where the sphere 220 intersects a particular region 222 corresponding to a direction in which the user views.

FIG. 3 is a diagram illustrating examples of viewing depending on n-degrees of freedom according to an embodiment of the present disclosure.

Referring to FIG. 3, in the case of three degrees of freedom viewing 310, a conventional apparatus for providing a 360-degree video possibly provides only three degrees of freedom in which only rotation about three-dimensional coordinate axes with the origin 314 of a sphere 312 in the center is allowed, and thus a viewing degree of freedom for viewers is limited. Therefore, like six degrees of freedom viewing 320, it is required to study a technique of providing depth information as well as image information of a subject such that even though the user moves freely for viewing in six degrees of freedom, the user can view the corresponding region, e.g., the side of the subject.

The foregoing is intended merely to aid in the understanding of the background of the present disclosure, and is not intended to mean that the present disclosure falls within the purview of the related art that is already known to those skilled in the art.

SUMMARY OF THE INVENTION

Accordingly, the present disclosure has been made keeping in mind the above problems occurring in the related art, and the present disclosure is intended to propose an image processing apparatus and method for omni-directional videos.

Also, the present disclosure is intended to propose an apparatus and method of expressing, in three-dimensional space, image information and depth information of an omni-directional video.

Also, the present disclosure is intended to propose an apparatus and method of transforming image information and depth information of an omni-directional video expressed in three-dimensional space and expressing the result on a two-dimensional plane.

It is to be understood that technical problems to be solved by the present disclosure are not limited to the aforementioned technical problems and other technical problems which are not mentioned will be apparent from the following description to a person with an ordinary skill in the art to which the present disclosure pertains.

In order to achieve the above object, according to one aspect of the present disclosure, there is provided an image processing method including: obtaining at least one of image information and depth information of an omni-directional video; and mapping the obtained information to a three-dimensional coordinate system based on a particular three-dimensional figure.

According to another aspect of the present disclosure, there is provided an image processing apparatus configured to: obtain at least one of image information and depth information of an omni-directional video; and map the obtained information to a three-dimensional coordinate system based on a particular three-dimensional figure.

It is to be understood that the foregoing summarized features are exemplary aspects of the following detailed description of the present disclosure without limiting the scope of the present disclosure.

According to the present disclosure, an image processing apparatus and method relating to an omni-directional video may be provided.

Also, according to the present disclosure, an apparatus and method of expressing image information and depth information of an omni-directional video, such as a 360-degree image, a light field image, a point cloud image, etc., in three-dimensional space may be provided.

Also, according to the present disclosure, an apparatus and method of transforming the image information and depth information of the omni-directional video expressed in three-dimensional space and expressing the result on a two-dimensional plane, and performing inverse transformation thereon may be provided.

Effects that may be obtained from the present disclosure will not be limited to only the above described effects. In addition, other effects which are not described herein will become apparent to those skilled in the art from the following description.

BRIEF DESCRIPTION OF THE DRAWINGS

The above and other objects, features and other advantages of the present disclosure will be more clearly understood from the following detailed description when taken in conjunction with the accompanying drawings, in which:

FIG. 1 is a diagram illustrating different types of omni-directional cameras for obtaining 360-degree videos according to an embodiment of the present disclosure;

FIG. 2 is a diagram illustrating reproduction space of a 360-degree video provided to the user according to an embodiment of the present disclosure;

FIG. 3 is a diagram illustrating examples of viewing depending on n-degrees of freedom according to an embodiment of the present disclosure;

FIG. 4 is a diagram illustrating examples of projection relating to a 360-degree video according to an embodiment of the present disclosure;

FIG. 20 is a flowchart illustrating a method of generating a common projection format according to an embodiment of the present disclosure;

DETAILED DESCRIPTION OF THE INVENTION

Figure 5:
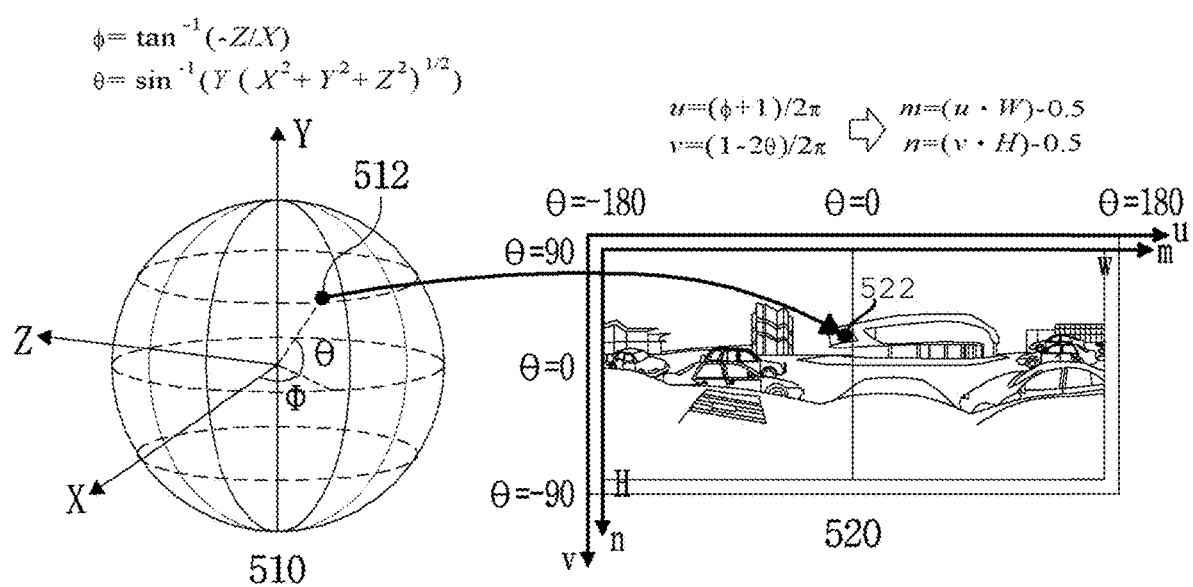
FIG. 5 is a diagram illustrating a process of transforming a 360-degree video into a video in an ERP format according to an embodiment of the present disclosure.

The present invention is described more fully hereinafter with reference to the accompanying drawings, in which embodiments of the present invention are shown. This present invention may, however, be embodied in many different forms and should not be construed as limited to the embodiments set forth herein. Rather, these embodiments are provided so that this disclosure is thorough, and will fully convey the scope of the present invention to those skilled in the art. The similar reference numerals refer to the same or similar functions in various aspects. In the drawings, the shapes and sizes of elements may be exaggerated for clarity. In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a certain feature, structure, or characteristic described herein in connection with one embodiment may be implemented within other embodiments without departing from the spirit and scope of the invention. In addition, it is to be understood that the location or arrangement of individual elements within each disclosed embodiment may be modified without departing from the spirit and scope of the invention. The following detailed description is, therefore, not to be taken in a limiting sense, and the scope of the present invention is defined only by the appended claims, appropriately interpreted, along with the full range of equivalents to which the claims are entitled.

It will be understood that, although the terms including ordinal numbers such as "first", "second", etc. may be used herein to describe various elements, these elements are not limited by these terms. These terms are only used to distinguish one element from another. For example, a second element could be termed a first element without departing from the teachings of the present inventive concept, and similarly a first element could be also termed a second element. The term "and/or" includes any and all combination of one or more of the associated items listed.

When an element is referred to as being "connected to" or "coupled with" another element, it can not only be directly connected or coupled to the other element, but also it can be understood that intervening elements may be present. In contrast, when an element is referred to as being "directly connected to" or "directly coupled with" another element, there are no intervening elements present.

The components as used herein may be independently shown to represent their respective distinct features, but this does not mean that each component should be configured as a separate hardware or software unit. In other words, the components are shown separately from each other for ease of description. At least two of the components may be combined to 5 configure a single component, or each component may be split into a plurality of components to perform a function. Such combination or separation also belongs to the scope of the present invention without departing from the gist of the present invention.

Terms used in the application are merely used to describe particular embodiments and are not intended to limit the present disclosure. A singular expression includes a plural expression unless the context clearly indicates otherwise. In the application, terms such as "include" or "have" are should be understood as designating that features, number, steps, operations, elements, parts, or combinations thereof exist and not as precluding the existence of or the possibility of adding one or more other features, numbers, steps, operations, elements, parts, or combinations thereof in advance. That is, in the present invention, the contents describing the specific configuration as "including" does not exclude the configuration other than the configuration thereof, and the additional configurations may be included within the scope of the practice of the invention or the technical scope of the invention.

Some elements may not serve as necessary elements to perform an essential function in the present invention, but may serve as selective elements to improve performance. The present invention may be embodied by including only necessary elements to implement the spirit of the present invention excluding elements used to improve performance, and a structure including only necessary elements excluding selective elements used to improve performance is also included in the scope of the present invention.

Hereinbelow, reference will now be made in detail to the preferred embodiments of the present invention, examples of which are illustrated in the accompanying. In the detailed description of the preferred embodiments of the disclosure, however, detailed depictions of well known related functions and configurations may be omitted so as not to obscure the art of the present disclosure with superfluous detail. Also, the same or similar reference numerals are used throughout the different drawings to indicate similar functions or operations.

FIG. 4 is a diagram illustrating examples of projection relating to a 360-degree video according to an embodiment of the present disclosure.

The 360-degree video (or omni-directional video) differs from a conventional two-dimensional video in shape or characteristics of the image. However, when the 360-degree video is transformed into a two-dimensional form as being projected within a rectangular range, even through a method or apparatus for processing the conventional two-dimensional video is used, various image processing techniques, such as post-processing, storage, editing, calibration, compression encoding, reproduction, etc., may apply to the transformed 360-degree video in the two-dimensional form. Referring to FIG. 4, representative projection formats for 360-degree video include an equi-rectangular projection 410 (ERP) format, a cube map projection 420 (CMP) format, an icosahedral projection 430 (ISP) format, an octahedron projection (OCP) (not shown) format, a tetrahedron format (not shown), a dodecahedron format (not shown), etc. Among the various projection formats, a generally used projection format for the 360-degree image is the ERP format.

FIG. 5 is a diagram illustrating a process of transforming a 360-degree video into a video in an ERP format according to an embodiment of the present disclosure.

When the 360-degree video is projected on a surface 510 of a three-dimensional sphere, a three-dimensional XYZ coordinate system is used for an arbitrary sample 512 such that longitude θ and latitude φ of the sample 512 is calculated. Also, positions u and v on the ERP coordinate system may be calculated by using the calculated longitude θ and latitude φ. Here, u may be obtained by setting the left and right with respect to the center of the u-axis at a latitude φ of −180 degrees and a latitude φ of 180 degrees, respectively. Also, in the same manner as u, v may be obtained by setting the top and bottom with respect to the center of the v-axis at a longitude θ of −90 degrees and a longitude θ of 90 degrees, respectively. When an ERP video has particular resolution of width W × height H, m and n to which information on the resolution is applied may be obtained for the calculated u and v. Therefore, an ERP sample 522 on an ERP coordinate system 520 corresponding to the arbitrary sample 512 on the surface 510 of the three-dimensional sphere may be obtained. For example, a process of deriving (θ, φ), a process of deriving (u, v), and a process of deriving (m, n) may be expressed as Equation 1 to Equation 3, respectively.

$$\phi = \tan^{-1}(-Z/X)$$

$$\theta = \sin^{-1}(Y(X^2+Y^2+Z^2)^{1/2}) \qquad \text{[Equation 1]}$$

$$u - (\phi+1)/2\pi$$

$$v - (1-2\theta)/2\pi \qquad \text{[Equation 2]}$$

$$m = (u \cdot W) - 0.5$$

$$n = (v \cdot H) - 0.5 \qquad \text{[Equation 3]}$$

Also for a CMP format image, an ISP format image, etc., transformation from the three-dimensional 360-degree video may be performed by using a method similar to the above-described process.

As described above with reference to FIG. 4 or 5, as projection formats in which the conventional 360-degree video projected (or mapped) on the surface of the three-dimensional sphere is transformed into the two-dimensional form, there are ERP, CMP, ISP, OCP, tetrahedron, dodecahedron formats, etc. In the formats, image information and depth information of objects are mapped only on the surface of the sphere and only three degrees of freedom that support only rotation of the user's head are supported, and thus there is limitation to provide free movement for viewing relating to six degrees of freedom in which the user may freely move and view around the three-dimensional space. In the meantime, for various types of filmed images, such as 360-degree images, light field images, point cloud images, panoramic images, general video images, etc., depth information of the objects contained in the filmed images is required to provide six degrees of freedom in which free movement for viewing is possible. For example, depth information may mean a distance value from the camera to the object within the filmed image. When the depth information of the filmed image is obtained, a depth image is obtained by expressing the depth information in the form of an image.

Figure 6:
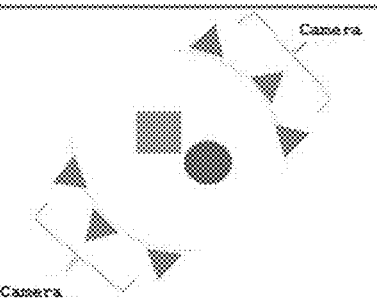
FIG. 6 is a diagram illustrating examples of a point cloud image and of a light field image according to an embodiment of the present disclosure.

FIG. 6 is a diagram illustrating examples of a point cloud image and of a light field image according to an embodiment of the present disclosure.

A point cloud method 610 is a method of simultaneously filming one scene at different positions in the vicinity thereof and reconstructing the filmed result in three-dimensions, and through the above process, a point cloud image 612 may be obtained. A light field method 620 is a method of obtaining a multi-view image and depth image corresponding to the multi-view image by using a light field camera. Referring to FIG. 6, a 360-degree image and a depth image 622 may be obtained by using a 360-degree camera. The point cloud method and the light field method are methods capable of obtaining single or multiple pieces of image information and of depth information together. For example, the image information may mean brightness information, such as R, G, B or Y, Cb, Cr, etc., and color information, and the depth information may mean distance information from a sensor obtaining an image to the corresponding object.

In the meantime, the point cloud image consists of points having substantial three-dimensional values, and requires a large amount of data for one scene to obtain a point cloud with good quality, and thus it takes a lot of time and computation to compress or reproduce the image. Also, the light field image consists of images in a substantial number of views, and thus management, such as saving or editing the images all together, etc., is complicated.

Therefore, according to the present disclosure, there is provided a method of processing a three-dimensional image to overcome restriction on three degrees of freedom which is the limitation on the method of expressing the 360-degree video, and to solve the problems that high complexity and a large amount of data are required in the method of expressing the light field image or the point cloud image.

Figure 7:
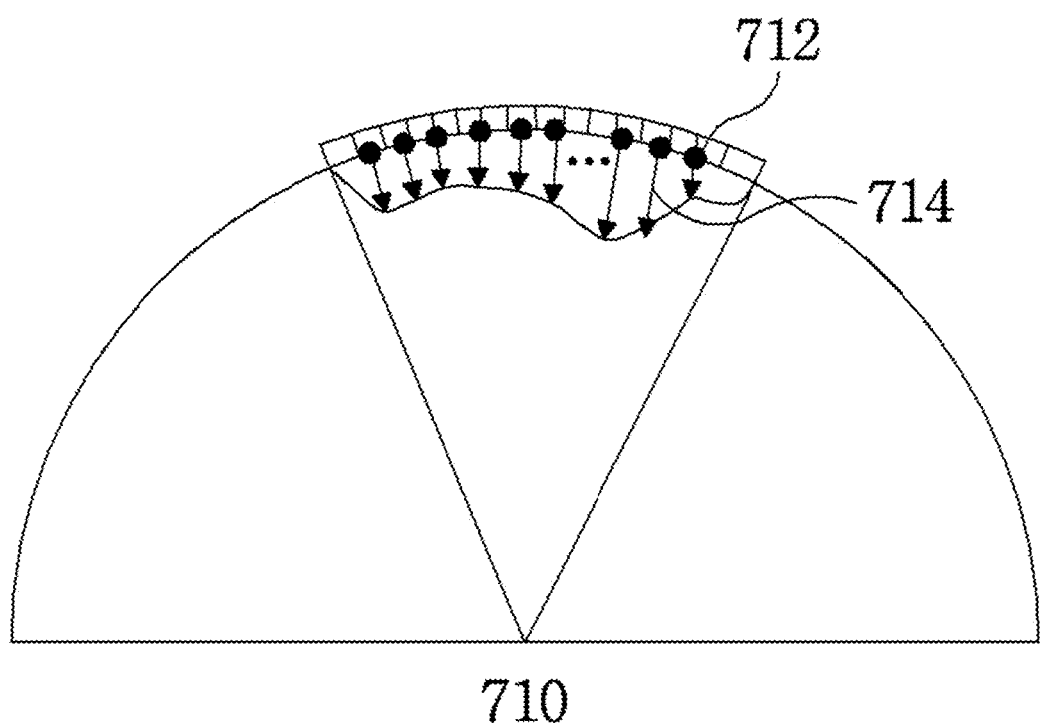
FIG. 7 is a diagram illustrating an example of expressing image information and depth information by using a three-dimensional sphere according to an embodiment of the present disclosure.

FIG. 7 is a diagram illustrating an example of expressing image information and depth information by using a three-dimensional sphere according to an embodiment of the present disclosure.

According to the method of processing the image of the present disclosure, the image information and the depth information contained in the light field image or in the point cloud image may be expressed by using a virtual three-dimensional sphere 710. For example, the image information may be expressed as pixel values 712 on the surface of the three-dimensional sphere, and depth values of respective pixels may be expressed as distance information (the length of the arrow) 714 in inward directions of the sphere. Therefore, in a conventional method of expressing the 360-degree video, only three-dimensional image information may be expressed by being mapped to pixel values on the surface of the sphere, whereas in the method of processing the image according to the present disclosure, both the image information and the depth information may be expressed by mapping the image information to the pixel value on the surface of the sphere and by expressing the depth information corresponding to each pixel as the distance information in the inward direction of the sphere. According to the method of processing the image of the present disclosure, in the six degrees of freedom viewing 320 in FIG. 3, even when the viewer's perspective moves, the pixel value at the position of the depth information is reconstructed, and thus the image information corresponding to the side of the subject in the moved view is reconstructed.

Figure 8:
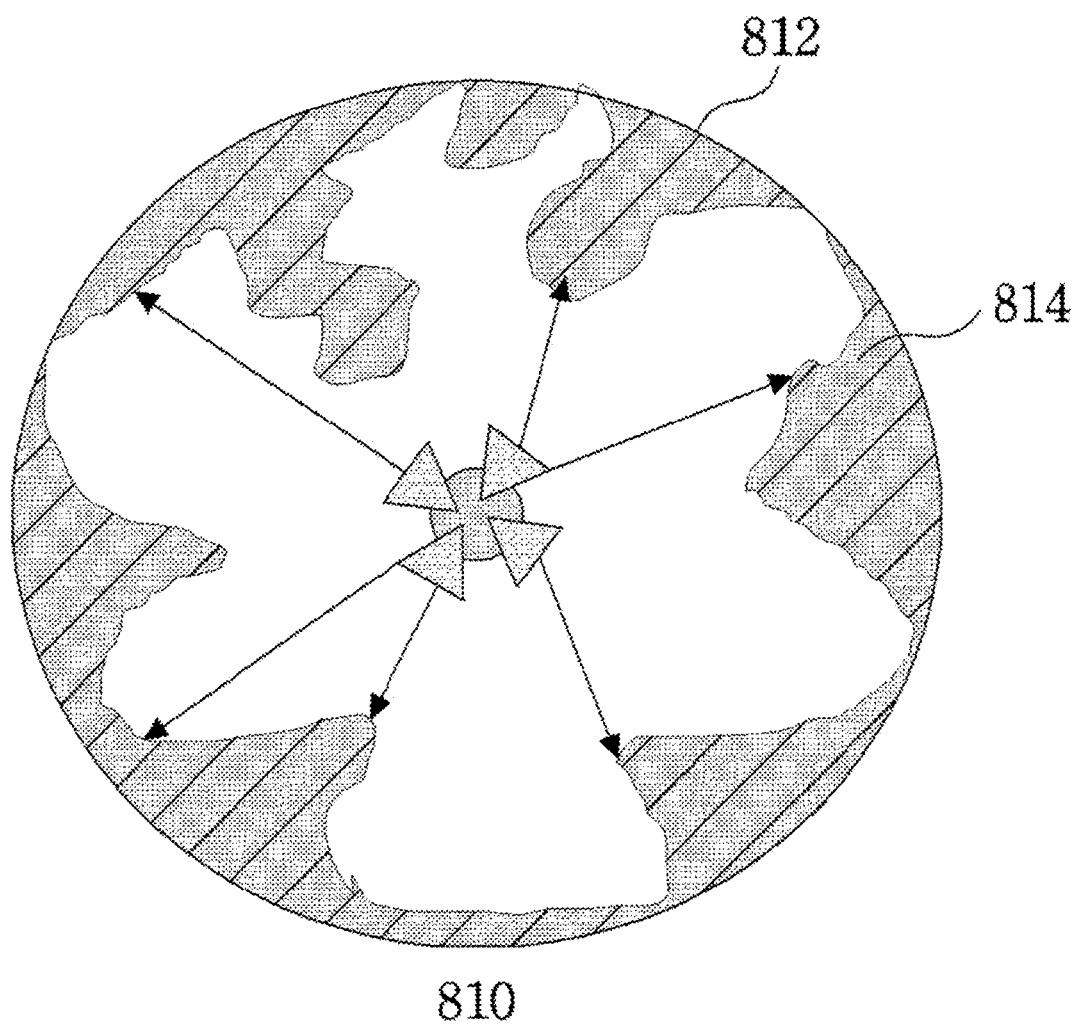
FIG. 8 is a diagram illustrating an example of expressing, by using a three-dimensional sphere, three-dimensional image information and depth information obtained by a divergent method according to an embodiment of the present disclosure.

FIG. 8 is a diagram illustrating an example of expressing, by using a three-dimensional sphere, three-dimensional image information and depth information obtained by a divergent method according to an embodiment of the present disclosure.

Referring to a cross section 810 of the three-dimensional sphere for showing how the image information and the depth information are expressed in the three-dimensional sphere, the image information may be mapped to pixel values on a surface of the sphere 812, and the depth information may be mapped inside the sphere, such as a slashed region 814. For example, the depth information may mean a distance from the center of the sphere to the surface of the mapped region. A method of expressing the depth information will be described in detail with reference to FIG. 10.

Figure 9:
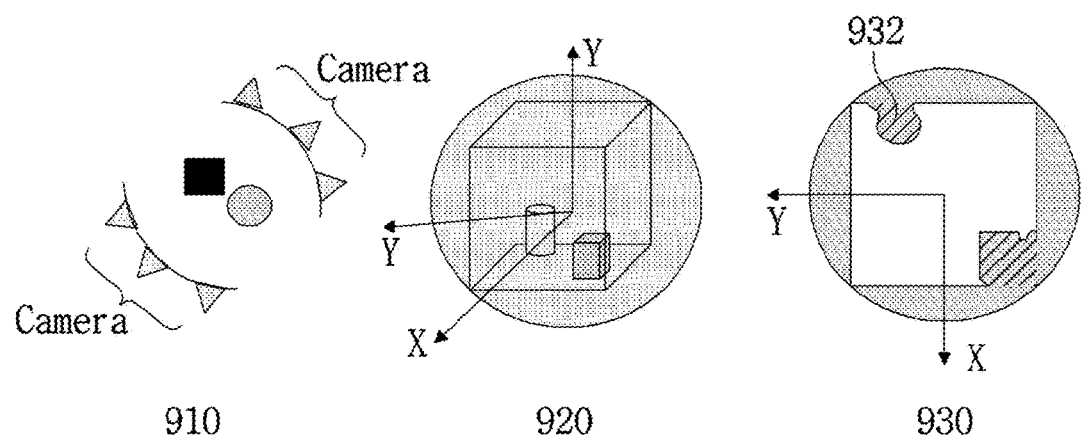
FIG. 9 is a diagram illustrating examples of expressing, by using a three-dimensional sphere, three-dimensional image information and distance information obtained by a convergent method according to an embodiment of the present disclosure.

FIG. 9 is a diagram illustrating examples of expressing, by using a three-dimensional sphere, three-dimensional image information and distance information obtained by a convergent method according to an embodiment of the present disclosure.

First, according to an embodiment 910 of a method of filming a convergence camera type image, image information and depth information of a three-dimensional video may be obtained, and the obtained information may be expressed by using a three-dimensional spherical coordinate system. For example, according to an embodiment 920 of an expression method using a three-dimensional sphere, image information and depth information of a three-dimensional video may be expressed by setting an XYZ coordinate system on a three-dimensional sphere. Specifically, for example, according to an embodiment 930 shown in a cross section of a three-dimensional sphere, image information may be mapped to a pixel value on the surface of the sphere, and depth information may be mapped to a distance from the center of the sphere to the surface of an object 932 (a slashed region).

As shown in FIGS. 7 to 9, when expressing the image information and the depth information on three-dimensional target subjects by using the virtual three-dimensional sphere, the image information may be expressed as pixel values on the surface of the sphere, and the depth information corresponding to each pixel may be expressed as the distance information in the inward direction or in the outward direction of the sphere. According to the present disclosure, for convenience, it is assumed that the depth information is expressed as the distance information in the inward direction of the sphere (i.e., the direction of the center of the sphere from the surface of the sphere), but the depth information may be expressed as distance information in the opposite direction (e.g., distance information in the radial direction coming from the center of the sphere, or distance information in the outward direction from the center of the sphere to the surface of the sphere).

Figure 10:
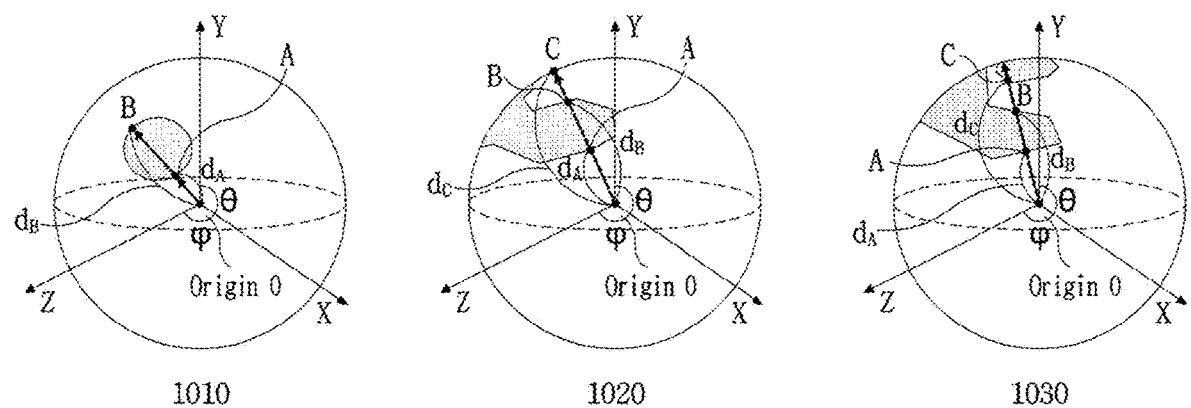
FIG. 10 is a diagram illustrating examples of expressing an object region contained in an image by using a spherical coordinate system according to an embodiment of the present disclosure.

FIG. 10 is a diagram illustrating examples of expressing an object region contained in an image by using a spherical coordinate system according to an embodiment of the present disclosure.

Information on a sample in arbitrary space may be expressed by using a spherical coordinate system (r, θ, ϕ) or an orthogonal coordinate system (X, Y, Z), and in the present disclosure, for convenience, the sample is expressed by using the spherical coordinate system. Referring to FIG. 10, in a first embodiment 1010 in which an object region contained in the image is positioned inside the sphere, a second embodiment 1020 in which an object region contained in the image meets the surface of the sphere and is also positioned inside the sphere, and in a third embodiment 1030 in which the image contains two object regions, positions A, B, and C on respective subject surfaces may be expressed by using the spherical coordinate system as shown in Table 1.

TABLE 1

| Category | Position expression in spherical coordinate system | Expression of visible direction |
| --- | --- | --- |
| First embodiment | A = ($d_A$, θ, ϕ), B = ($d_B$, θ, ϕ) | $i_A$ = 1, $i_B$ = 0 |
| Second embodiment | A = ($d_A$, θ, ϕ), B = ($d_B$, θ, ϕ) | $i_A$ = 1, $i_B$ = 0 |
| Third embodiment | A = ($d_A$, θ, ϕ), B = ($d_B$, θ, ϕ), C = ($d_C$, θ, ϕ) | $i_A$ = 1, $i_B$ = 0, $i_C$ = 1 |

Figure 11:
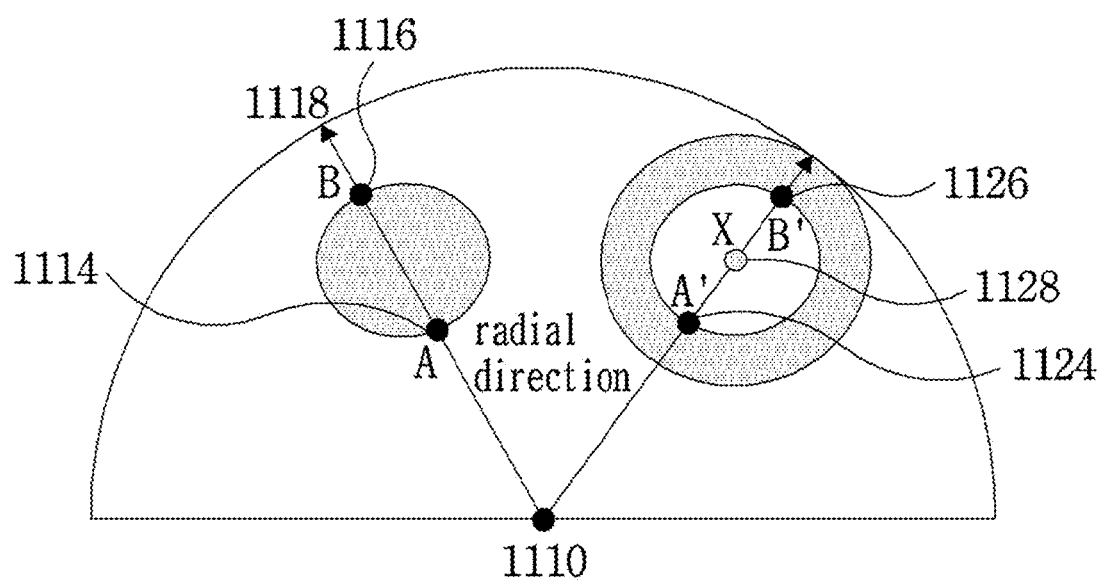
FIG. 11 is a diagram illustrating a visible direction and a radial direction according to an embodiment of the present disclosure.

The meaning of "expression of visible direction" in Table 1 will be described in detail with reference to FIG. 11. FIG. 11 is a diagram illustrating a visible direction and a radial direction according to an embodiment of the present disclosure. A direction of a straight line passing from the center 1110 of the sphere to a point in space may be referred to as a radial direction coming from the center 1110 of the sphere. For example, the direction of a first arrow 1112 faces a point (e.g., A 1114 or B 1116) in space from the center 1110 of the sphere, and may be referred to as a radial direction coming from the center 1110 of the sphere. Alternatively, the direction of a second arrow 1122 faces a point (e.g., A' 1124 or B' 1126) in space from the center 1110 of the sphere, and may be referred to as a radial direction coming from the center 1110 of the sphere. In the meantime, the points on the surface of the object may be categorized as cases of being observable in the radial direction and not observable. For example, the point A 1114 is observable in the radial direction (i.e., the direction facing the point A 1114 from the center 1110 of the sphere), but the point B 1116 is hidden by the subject and is not observable in the radial direction. Here, the point B 1116 is observable in the direction (i.e., the direction facing the center 1114 of the sphere from the surface of the sphere 1118) opposite to the radial direction. That is, when an arbitrary point positioned on the subject surface is observed at a point on a straight line in the radial direction, the point is always observed only in one of the radial direction or the direction opposite to the radial direction. Also, for example, the point A' 1124 is not observable in the radial direction, but is observable in the opposite direction (e.g., the direction of the center 1110 of the sphere from the point X 1128). The point B' 1126 is observable in the radial direction, but is not observable in the direction of the center 1110 of the sphere from the outer position of the sphere.

In the present disclosure, a direction in which a point on the surface of the object is observable on a radial straight line is defined as a visible direction, and an indicator i applies to express the visible direction and may be defined as follows. For example, it may be defined as i=1 (true) when the visible direction is the same as the radial direction, and i=0 (false) when the visible direction is different form the radial direction. For example, values of indicators i for expressing the visible direction with respect to the points A 1114, B 1116, A' 1124, and B' 1126 on the subject surfaces in FIG. 11 may be expressed by $i_A$=1, $i_B$=0, $i_{A'}$=0, and $i_{B'}$=1, respectively.

Figure 12:
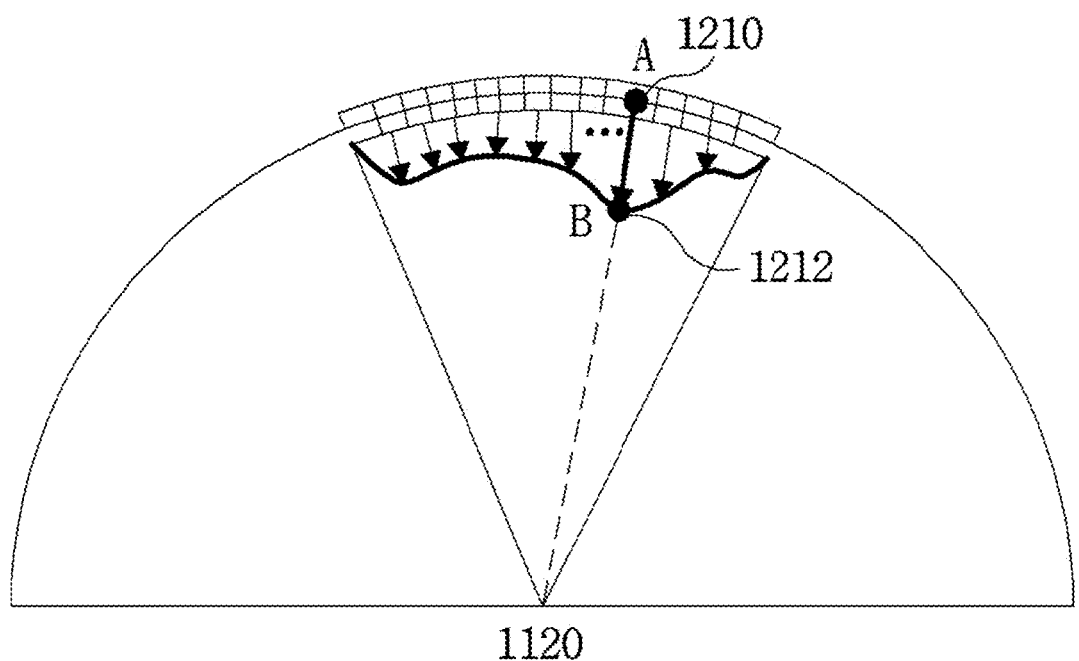
FIG. 12 is a diagram illustrating an example of expressing depth information according to an embodiment of the present disclosure.

FIG. 12 is a diagram illustrating an example of expressing depth information according to an embodiment of the present disclosure.

Referring to FIG. 12, a method of expressing depth information (distance information) from a given reference point to the subject surface will be described. Distance information from a point A 1210 of a pixel positioned on the surface of the sphere to a point B 1212 of the subject surface mapped on a straight line (a dotted line direction) in direction of the center 1220 of the sphere may be expressed as a distance between the point A 1210 and the point B 1212. Distances of the subject surface from all pixels on the surface of the sphere corresponding thereto may be obtained by using the method of obtaining the distance information between the point A 1210 and the point B 1212. In the meantime, like the embodiment in FIG. 12, the distance information may be obtained by using the direction of the center of the sphere from the position of the pixel on the surface of the sphere, and conversely, by using the direction of the target pixel from the center. The sum of the distances obtained from the former and the latter is the radius of the sphere, and thus no matter which direction is used, the same result is obtained. However, for convenience, the following description will be made using the method of obtaining the distance information by using the direction of the center of the sphere from the position of the pixel on the surface of the sphere.

The distance information (or depth information) obtained through the embodiment in FIG. 12 may be expressed in various scales. For example, the distance between the point A 1210 and the point B 1212 may be expressed in uniform scaling as well as in logarithmic scaling, sine scaling, n-squared scaling, etc., without being limited thereto. The non-uniform scaling may be advantageously used when the importance of the information decreases or increases in the outward direction from the center of the sphere. For example, since the surface area of the sphere is proportional to the square of the radius of the sphere, when the radius of the sphere is doubled, the surface area of the sphere is quadrupled. In order to express the same range of viewing angle at the same density, the number of pixels is required to be quadrupled for uniform scaling. In the case where information of the image is less important in the outward direction from the center of the sphere and high-resolution expression is unnecessary, when the distance from the center of the sphere in the radial direction is expressed by a function, such as a logarithm function, of which the rate of change monotonously decreases, increase in the number of pixels in the surface of the sphere is less even though the distance increases, compared to uniform scaling.

Figure 13:
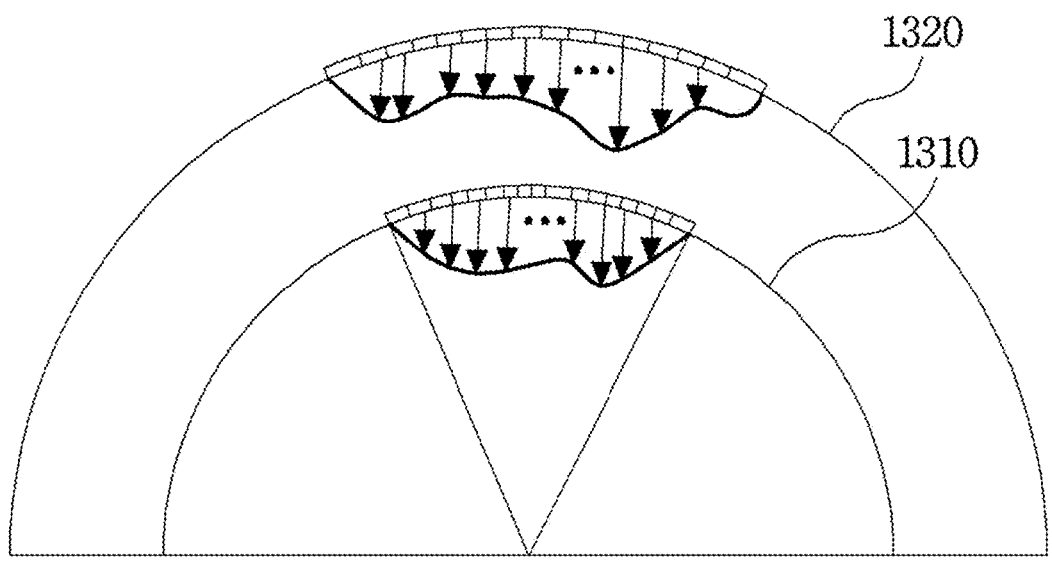
FIG. 13 is a diagram illustrating an example of expressing image information and depth information by using a multi-layered sphere according to an embodiment of the present disclosure.

FIG. 13 is a diagram illustrating an example of expressing image information and depth information by using a multi-layered sphere according to an embodiment of the present disclosure.

FIG. 12 shows the example of the case where only one subject surface is present in the radial direction from the center of the sphere, but like the third embodiment 1030 where two object regions are contained in the image in FIG. 10, the case where multiple subject surfaces are present may occur. In this case, using a multilayered sphere may be advantageous in expressing the image information and the depth information. FIG. 13 shows the case where two subject surfaces are present. In this case, by using two spheres (e.g., a first sphere 1310 and a second sphere 1320), image information (pixel value) and depth information (distance value) corresponding to each pixel may be expressed for each sphere. When the depth information is expressed by using the multilayered sphere, there is limitation that the surface of the subject presenting between adjacent two layers is expressed in only one of the two layers so as to avoid duplication of the depth information. The multilayered sphere may be configured in various shapes, and preferably, configuring the multilayered sphere to have the same center and different sizes (radius) may simplify the processing operation. Also, when mapping the distance value, the multilayered sphere may be selectively used to precisely express the point in three-dimensional space.

Figure 14:
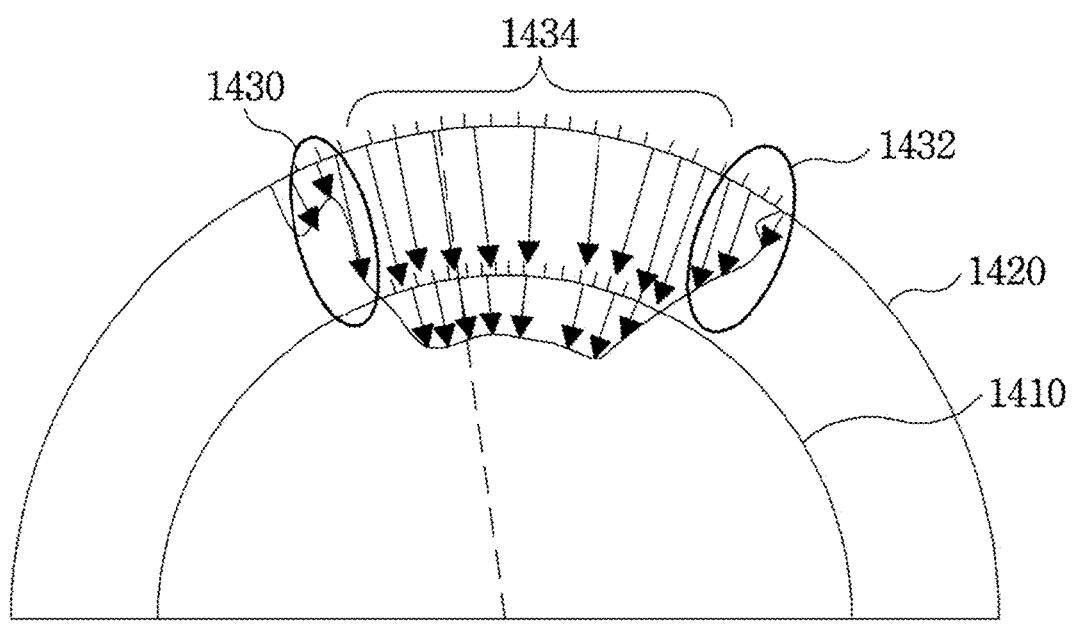
FIG. 14 is a diagram illustrating an example of expressing image information and depth information by using a multi-layered sphere according to another embodiment of the present disclosure.

FIG. 14 is a diagram illustrating an example of expressing image information and depth information by using a multilayered sphere according to another embodiment of the present disclosure.

FIG. 14 shows an example where one subject surface is expressed by using the multilayered sphere. The subject surface positioned on the end points of respective arrows contained in a first region 1430 and a second region 1432 is present between two spheres, and thus the depth information may be expressed only on the basis of the surface of an outer sphere 1420. Also, the subject surface positioned on the end points of respective arrows contained in a third region 1434 other than the first region 1430 and the second region 1432 is present inside the surface of the inner sphere 1410, and thus the depth information may be expressed only on the basis of the surface of the inner sphere 1410. In the meantime, in the case of the subject surface positioned on the end points of respective arrows contained in the third region 1434, by expressing, as additional depth information, the distance (i.e., the difference between the two spheres in radius) from the surface of the outer sphere 1420 to the surface of the inner sphere 1410, the distance from the surface of the outer sphere 1420 to the subject surface may be more easily obtained. That is, the distance from the surface of the outer sphere 1420 to the subject surface may be obtained by the sum of the depth information from the surface of the outer sphere 1420 and the depth information from the surface of the inner sphere 1410.

Figure 15:
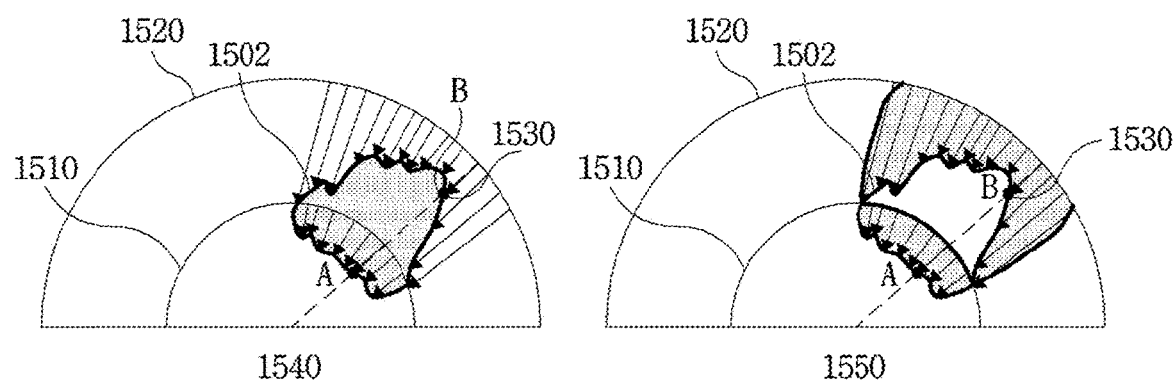
FIG. 15 is a diagram illustrating an example of reconstructing a subject region on the basis of image information and depth information expressed by using a multilayered sphere according to an embodiment of the present disclosure.

FIG. 15 is a diagram illustrating an example of reconstructing a subject region on the basis of image information and depth information expressed by using a multilayered sphere according to an embodiment of the present disclosure.

FIG. 15 shows an example of expressing depth information of a subject surface region 1502 (or a subject region), which is present inside the outermost sphere, as being divided in a multilayered sphere. The subject surface region 1502 may be divided into outer depth information expressed as the distance from the surface of an outer sphere 1520 and inner depth information expressed as the distance from the surface of an inner sphere 1510. Also, when using the outer depth information and the inner depth information or using visible direction information for each depth, the subject surface region 1502 is reconstructed in three-dimensional space. For example, in the case of an arbitrary point B 1530 corresponding to the subject surface that is present between the two spheres, when the value of the corresponding visible direction indicator is 0, the subject surface region 1502 is reconstructed in a first reconstruction form 1540. In contrast, when the value of the corresponding visible direction indicator is 1, the subject surface region 1502 is reconstructed in a second reconstruction form.

Figure 16:
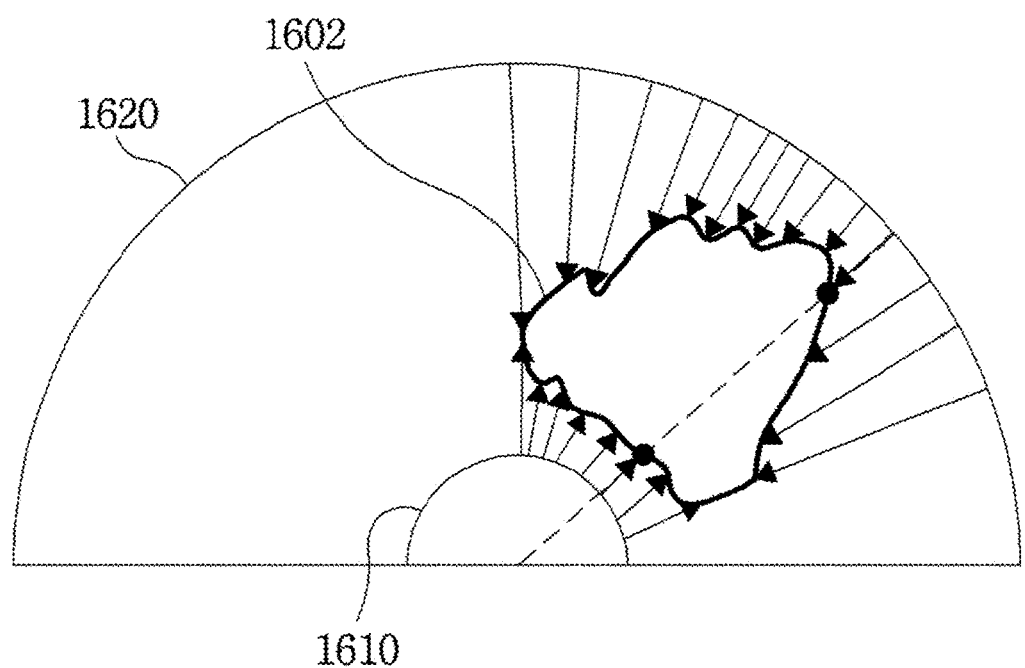
FIG. 16 is a diagram illustrating an example of reconstructing a subject region on the basis of image information and depth information expressed by using a multilayered sphere according to another embodiment of the present disclosure.

FIG. 16 is a diagram illustrating an example of reconstructing a subject region on the basis of image information and depth information expressed by using a multilayered sphere according to another embodiment of the present disclosure.

Referring to FIG. 16, with respect to a subject region 1602 which is the same as in FIG. 15, a multilayered sphere may be set in such a manner that the subject region 1602 is present between the surfaces of a two-layered sphere. In this case, the distance from the surface of an outer sphere 1620 to the subject surface may be expressed by being measured in the inward direction from the outer sphere 1620, and the distance from the surface of an inner sphere 1610 to the subject surface may be expressed by being measured in the outward direction from the inner sphere 1610. Like the embodiment in FIG. 16, even though directions in which distances are measured are not the same for all surfaces of the spheres, the embodiments described with reference to FIGS. 10 to 15 easily apply, and thus the detailed description thereof will be omitted.

Figure 17:
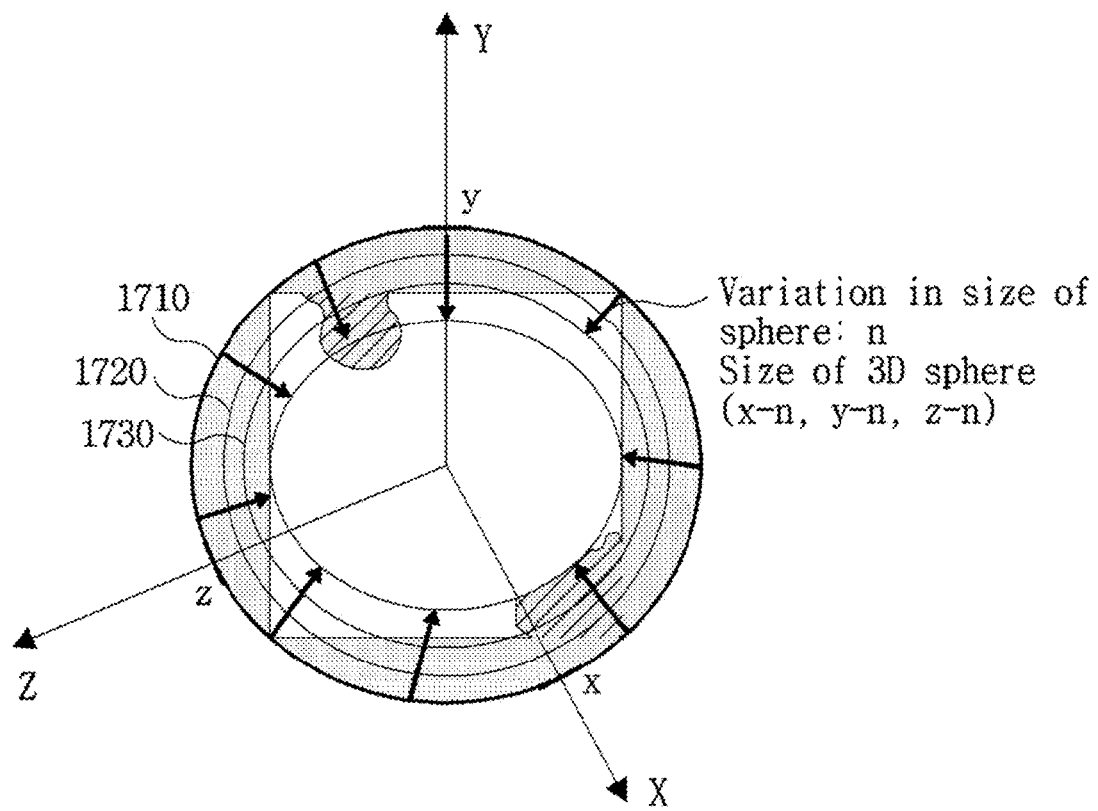
FIG. 17 is a diagram illustrating an example of a multi-layered sphere in which each sphere increases in size by uniform spacing according to an embodiment of the present disclosure.

FIG. 17 is a diagram illustrating an example of a multilayered sphere in which each sphere increases in size by uniform spacing according to an embodiment of the present disclosure.

FIG. 17 shows an example of mapping image information and depth information by using a three-dimensional sphere which consists of total four layers of a first layer sphere 1710, a second layer sphere 1720, a third layer sphere 1730, and a fourth layer sphere 1740. A slashed region 1750 may represent a mapped subject region. Also, the multilayered sphere is set in such a manner that each sphere increases in size (i.e., radius) by uniform spacing n (n is an integer larger than 0). When the multilayered sphere is set as described above, an image processing operation is simplified.

Figure 18A:
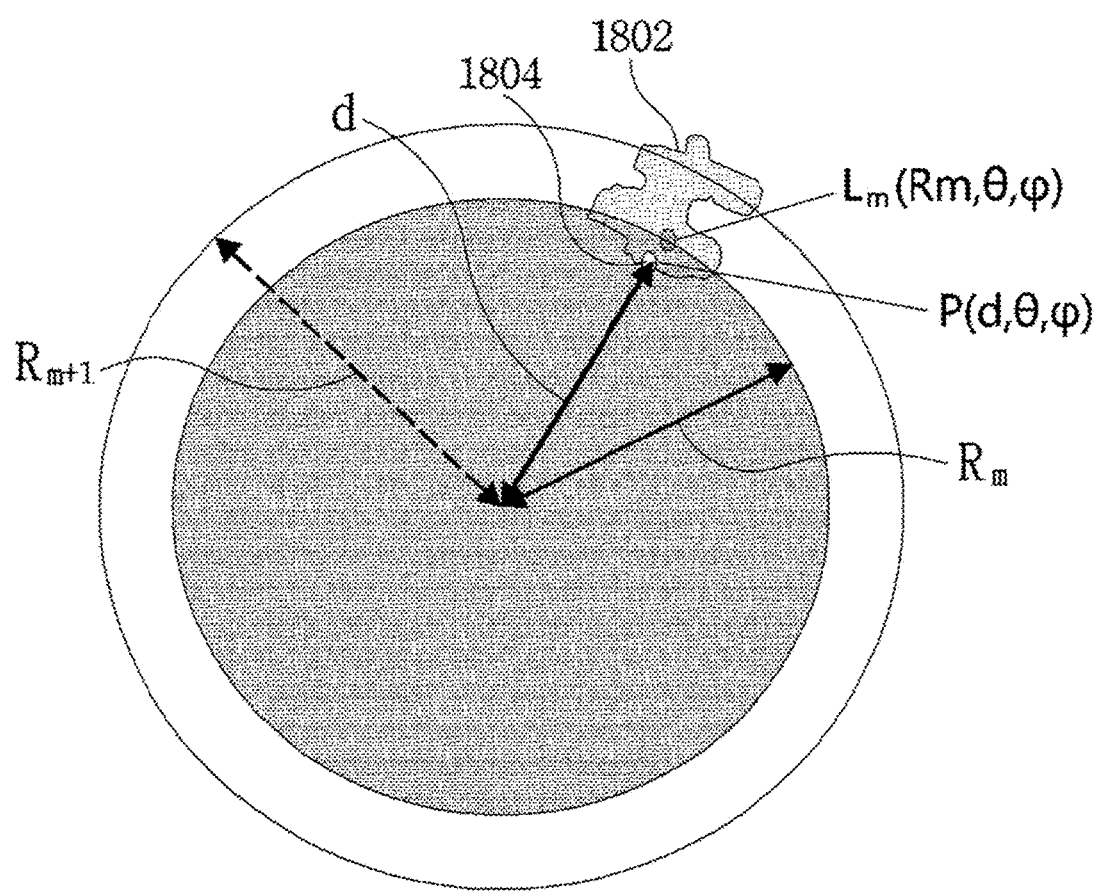
FIGS. 18A and 18B are diagrams illustrating an example of expressing color information by using a multilayered sphere according to an embodiment of the present disclosure.
Figure 18B:
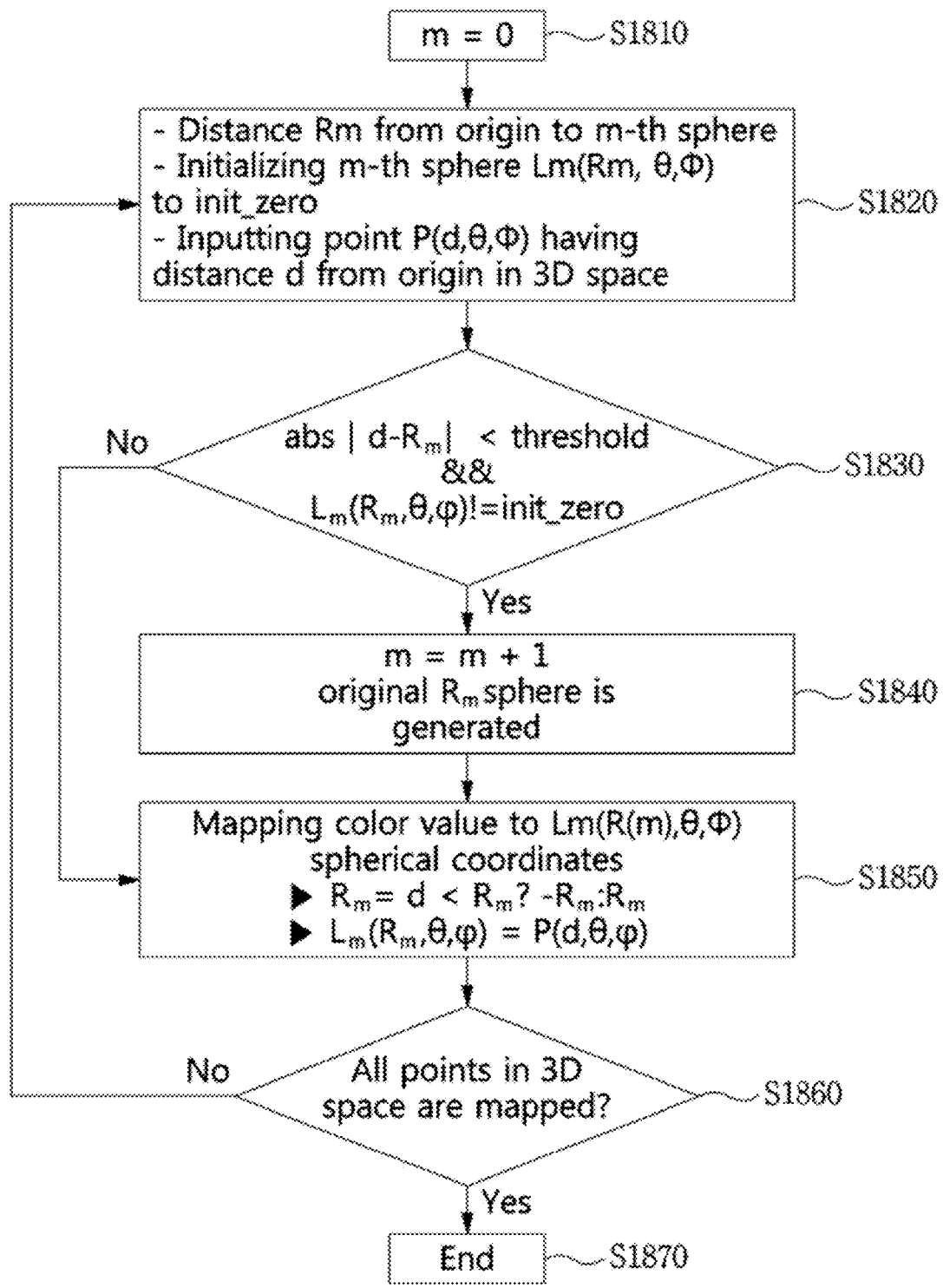

FIGS. 18A and 18B are diagrams illustrating an example of expressing color information by using a multilayered sphere according to an embodiment of the present disclosure.

Referring to FIGS. 18A and 18B, at step S1830, whether the multilayered sphere is generated or not may be determined according to a particular condition, and at step S1850, among samples of an arbitrary subject region 1802, a color value P of a sample 1804 having a distance d from the center of the sphere may be mapped to Lm in the spherical coordinate system.

Figure 19A:
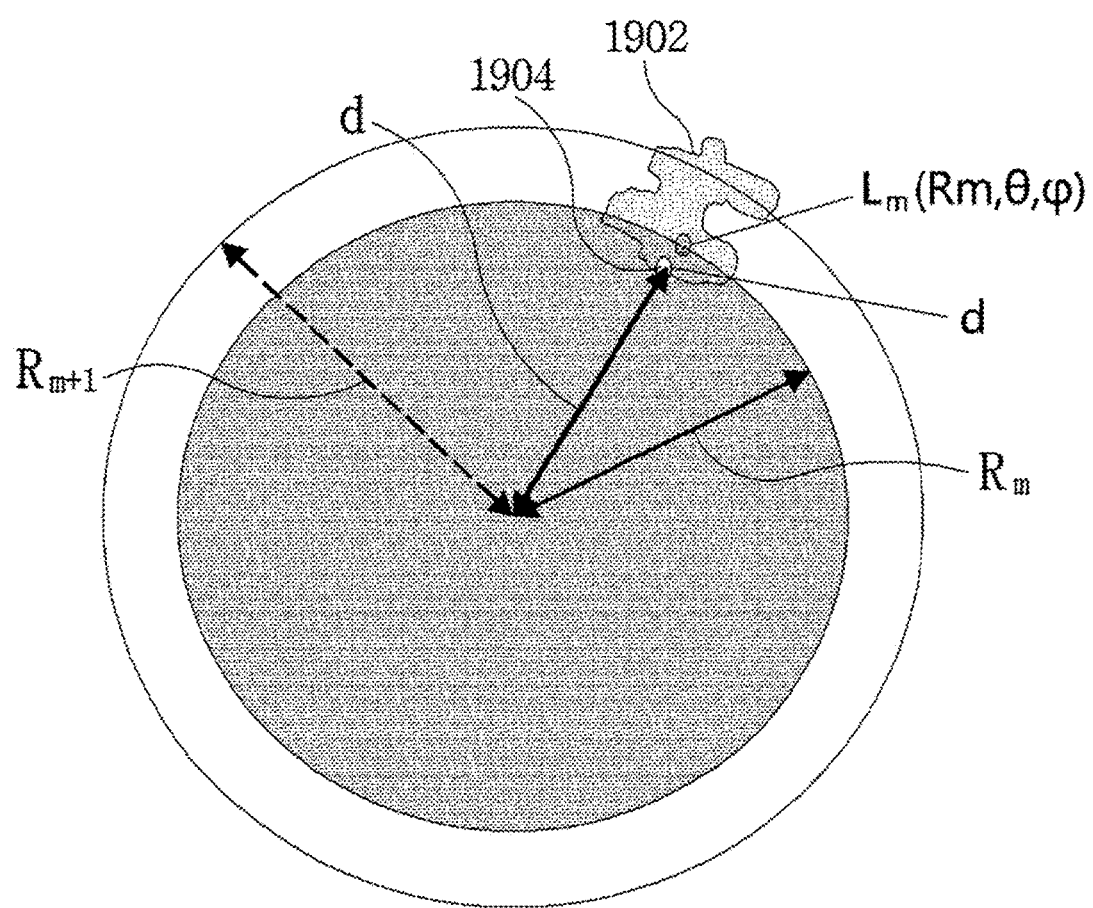
FIGS. 19A and 19B are diagrams illustrating an example of expressing distance information by using a multilayered sphere according to an embodiment of the present disclosure.
Figure 19B:
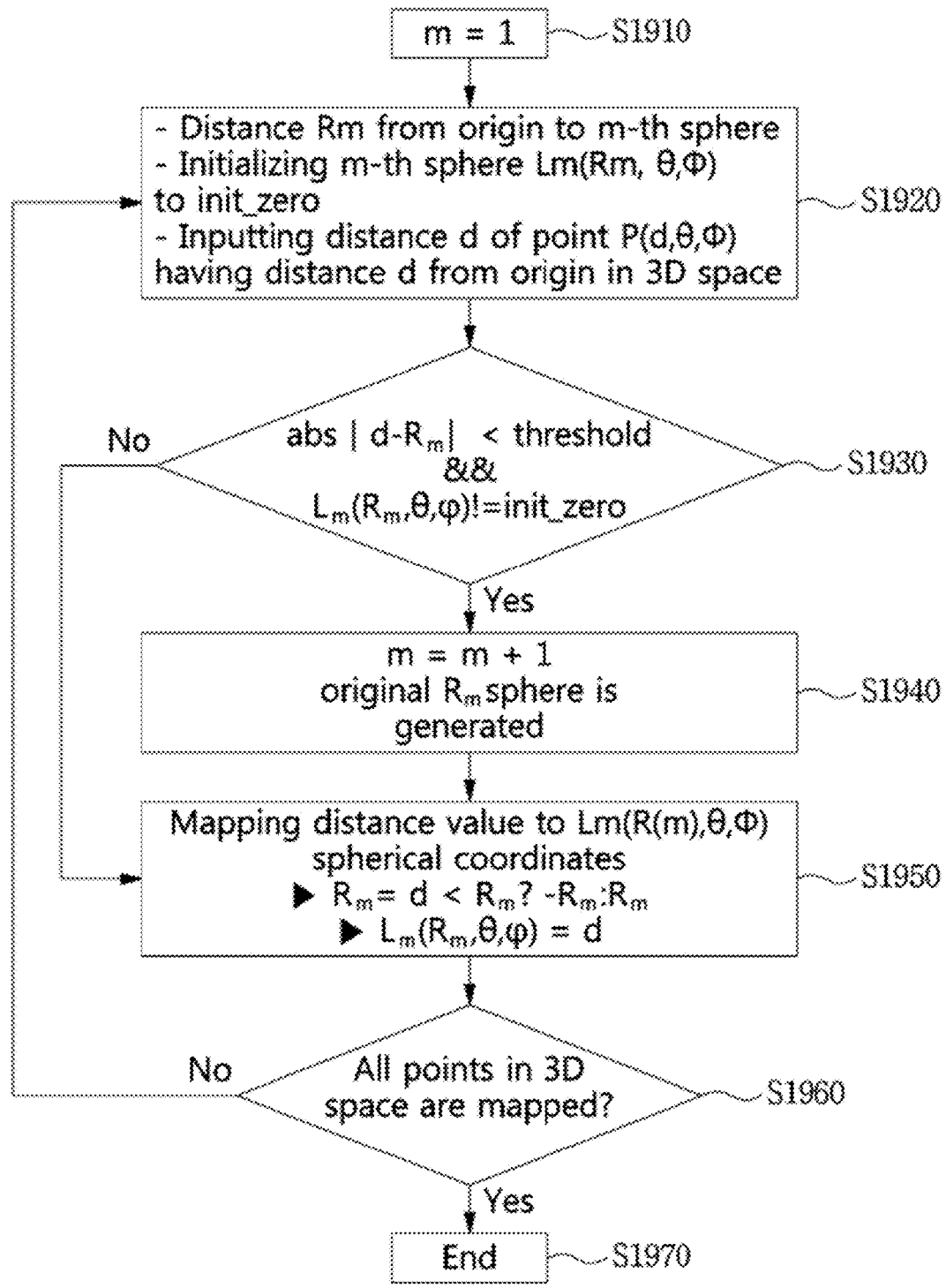

FIGS. 19A and 19B are diagrams illustrating an example of expressing distance information by using a multilayered sphere according to an embodiment of the present disclosure.

Referring to FIGS. 19A and 19B, at step S1930, whether the multilayered sphere is generated or not may be determined according to a particular condition, and step S1950, among samples of an arbitrary subject region 1902, a distance value d of a sample 1904 having a distance d from the center of the sphere may be mapped to Lm in the spherical coordinate system.

In the meantime, in the case of mapping the color information and the distance information to the multilayered sphere, when only a color value is expressed in the multilayered sphere, the distance information is expressed by the radius Rm of the sphere as a representative value. Also, when the color value and the distance information are expressed in the multilayered sphere together, d mapped to the sphere of the radius Rm is recorded as the distance information.

In the meantime, image information and depth information corresponding to the subject region mapped to m (m is an integer larger than 0) three-dimensional spheres may be transformed in m two-dimensional projection formats. When the image information and the depth information expressed on the basis of each sphere are arranged on the two-dimensional plane, it is necessary to consistently perform indexing on the corresponding pixel value and depth value with respect to the same two-dimensional coordinate values. For example, it is more advantageous in terms of complexity, when image pixel values positioned on the surface of the sphere and depth values of respective pixels are arranged on the two-dimensional plane having the same geometric structure. Therefore, with respect to a set consisting of the image information and the depth information that are expressed on the basis of m three-dimensional spheres, a set consisting of the image information and the depth information on multiple two-dimensional planes generated corresponding to the former set may be used to generate a common projection format on one two-dimensional plane. The common projection format will be described later in detail with reference to FIG. 20.

FIG. 20 is a flowchart illustrating a method of generating a common projection format according to an embodiment of the present disclosure.

At step S2020, depending on whether the R value of the pixels on the multilayered sphere is a negative (−) value or a positive (+) value, two common projection formats ERP_front and ERP_back may be generated, respectively. For example, two projection formats may be generated, such as a format (ERP_texture) in which the color value is projected and a format (ERP_depth) in which the distance value is projected. Also, the value of the format (ERP_depth) in which the distance value is projected may be expressed as the radius (Rm) of each sphere or the distance information d.

At step S2050, whether a pixel is present or not at the transformed position of the generated ERP_front or ERP_back is determined. As the result of determination, when a pixel is present at the transformed position, the pixel at the transformed position is left intact at step S2060. Also, as the result of determination, when a pixel is not preset at the transformed position, a pixel value is assigned to the transformed position at step S2070.

In the meantime, the method of generating the common projection format based on ERP format transformation is described, but without being limited thereto, various projection formats may be used.

In the meantime, the number of multilayered spheres may be designated by m, and the maximum number of multilayered spheres may be designated by n.

Figure 21:
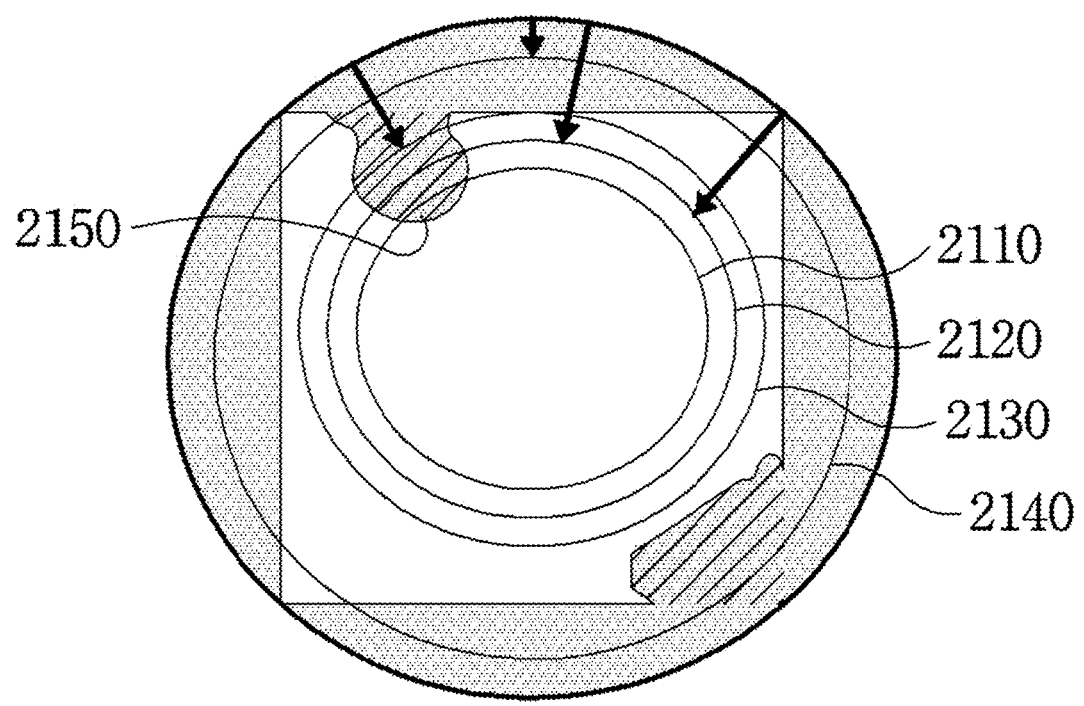
FIG. 21 is a diagram illustrating an example of changing the spacing between spheres depending on the importance of image information or depth information according to an embodiment of the present disclosure.

FIG. 21 is a diagram illustrating an example of changing the spacing between spheres depending on the importance of the image information or the depth information according to an embodiment of the present disclosure.

When the importance of the image information or the depth information varies depending on the distance from the center of the sphere, the spacing between spheres may be set differently. For example, when the spacing between spheres is narrow, depth information is densely expressed. In contrast, when the spacing between spheres is wide, depth information is sparsely expressed, resulting in reduction in information resolution of the side of the subject. For example, a first layer sphere 2110, a second layer sphere 2120, and a third layer sphere 2130 are close to the center of the sphere, and a fourth layer sphere 2140 is relatively far from the center of the sphere. Thus, the spacing between the third layer sphere 2130 and the fourth layer sphere 2140 may be relatively larger than spacing between the others. Also, for example, the first layer sphere 2110, the second layer sphere 2120, and the third layer sphere 2130 are relatively more closer to a slashed region 2150 where the subject is present than the fourth layer sphere, and thus the spacing between the others may be relatively narrower than the spacing between the third layer sphere 2130 and the fourth layer sphere 2140.

Figure 22:
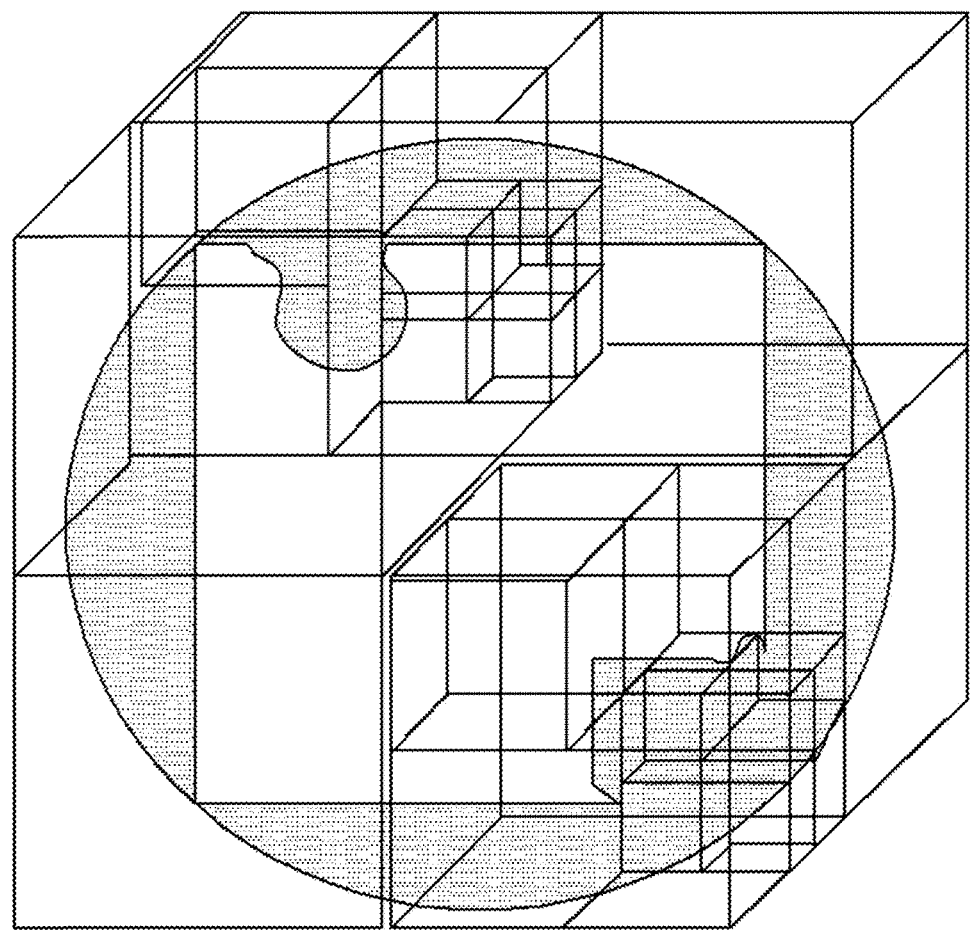
FIG. 22 is a diagram illustrating an example of partitioning image information and depth information mapped to a three-dimensional sphere into an octree form according to an embodiment of the present disclosure.

In the meantime, the image information and the depth information expressed on the basis of the three-dimensional sphere may be partitioned by various three-dimensional partition methods, and may be encoded or processed. FIG. 22 is a diagram illustrating an example of partitioning the image information and the depth information mapped to the three-dimensional sphere into an octree form according to an embodiment of the present disclosure. Also, as described above in FIG. 20, etc., the image information and the depth information expressed on the basis of the three-dimensional sphere may be expressed as being projected on the two-dimensional plane. The information expressed on the two-dimensional plane may be partitioned by various two-dimensional partition methods, such as in a quadtree, etc., and the result may be encoded or processed.

Also, the image information and the depth information expressed on the basis of the three-dimensional sphere may be used in various image processing operations, such as storage, transmission, encoding, decoding, reception, transformation, rendering, etc. Also, in addition to the image information and the depth information, various pieces of parameter information, such as visible direction information, the number of spheres, the size of each sphere, distance scale information, a projection manner to a two-dimensional plane, etc., may be used. The information may be transmitted to other devices by using various methods, such as a file, a transport stream, a compression stream, a parameter set, etc. For example, in an image compression method, such as HEVC, AVC, etc., the parameter information may be stored or transmitted/received by including the parameter information in a parameter set, such as a video parameter set (VPS), a sequence parameter set (SPS), a picture parameter set (PPS), etc. or in an additional information message, such as supplemental enhancement information (SEI), video usability information (VUI), etc. Also, for example, visible direction information may be expressed for each depth value. Here, for each pixel on the surface of the sphere, the pixel value, the depth value, and the visible direction information may present, and each value may be geometrically transformed into the form of an image on the two-dimensional plane. Table 2 shows examples of syntax for expressing the parameter information and of semantics for processing the syntax.

<Syntax>

TABLE 2

■multi_layer_spherical_format( payloadSize ) {
■  num_spheres
■  projection_direction
■  radial_distance_scale_type
■  if ( radial_distance_scale_type == 0 ) {
■    linear_scale_value
■  } else {
■    nonlinear_scaling_method TABLE 2-continued

```
    nonlinear_scaling_parameter
 }
 radial_distance_offset_value
 min_radius
 max_radius
 /* radius of each sphear */
 uniform_radius_spacing_flag
 if ( uniform_radius_spacing_flag == 1 ) {    /* uniform
   spacing */
   delta_radius_uniform_spacing
 } else {                    /* non-uniform spacing */
   for ( k = 0; k < NumSpheres; k++ ) {
     delta_radius[k]
   }
 }
}
```

<Semantics> num_spheres: information indicating the number of spheres for constructing a multilayered sphere.

projection_direction: information indicating in which direction the image information is mapped on the surface of the sphere when mapping the image information in the three-dimensional space to a position of the pixel on the surface of the sphere. For example, it has a value of 0 when the image information in three-dimensional space is projected in the direction of the surface of the sphere from the outside of the surface of the sphere, and in contrast, is has a value of 1 when the image information is projected in the direction of the surface of the sphere from the inside of the surface of the sphere.

radial_distance_scale_type: information indicating a type of distance scale on a straight line in the radial direction extending from the center of the three-dimensional sphere to the outside of the sphere. For example, when the distance linearly increases in the radial direction, it has the value of 0. When the distance non-linearly increases, it has the value of 1.

linear_scale_value: information indicating a linear scale value when the distance linearly changes in the radial direction (i.e., when the value of radial_distance_scale_type is 0). For example, it may have a value, such as 1, 2, 3, etc.

nonlinear_scaling_method: information indicating a type of non-linear function when the distance linearly changes in the radial direction (i.e., when the value of radial_distance_scale_type is 1). For example, as shown in Table 3, various distance transformation functions may be used depending on the value of nonlinear_scaling_method.

TABLE 3

| nonlinear_scaling_method | d: distance value of uniform scale<br>d': value of d expressed in non-uniform scale through non-linear transformation |
|---|---|
| 0 | $d' = \log_a (d), d = a^{d'}$ |
| 1 | $d' = d^{1/a}, d = d'^a$ |
| 2 | $d' = \sin(d/a), d = a * \arcsin(d')$ |
| ... | ... | nonlinear_scaling_parameter: information indicating a constant value (referring to Table 3, the a value) used in a non-linear transformation when the distance non-linearly changes in the radial direction (i.e., when the value of radial_distance_scale_type is 1).

min_radius: information indicating the minimum radius of the sphere.

max_radius: information indicating the maximum radius of the sphere.

radial_distance_offset_value: information corresponding to a constant value when the constant value is added to a distance value expressed in the radial direction for reconstruction.

uniform_radius_spacing_flag: information indicating whether the spacing between two adjacent spheres in the multilayered sphere, namely, the difference between the two spheres in radius is always uniform. For example, when the spacing between adjacent two spheres is always uniform, it has a value of 1; otherwise, it has a value of 0.

delta_radius_uniform_spacing: information indicating a spacing value when the spacing between two adjacent spheres in the multilayered sphere is always uniform.

delta_radius[k]: information indicating a difference value between the radius of the (k+1)-th sphere and the radius of the k-th sphere in order of distance from the center of the sphere in the multilayered sphere.

Figure 23:
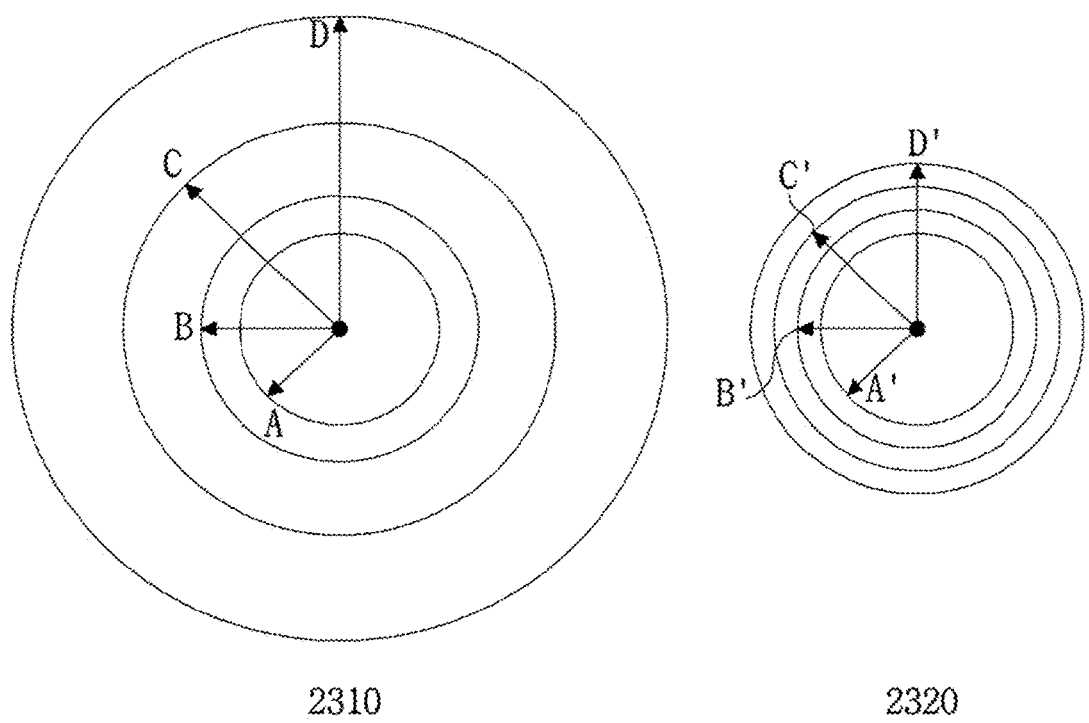
FIG. 23 is a diagram illustrating examples of four-layered spheres expressed in uniform scale space and in logarithmic scale space according to an embodiment of the present disclosure.

FIG. 23 is a diagram illustrating examples of four-layered spheres expressed in uniform scale space and in logarithmic scale space according to an embodiment of the present disclosure.

A first embodiment 2310 is an embodiment in which spheres of four layers have different radii A, B, C, and D in uniform scale space where a distance ratio in actual three-dimensional space remains the same in the spherical coordinate system. In the first embodiment 2310, the spacing between spheres increases in the direction of the outside from the center of the sphere. Thus, image information and depth information close to the center of the sphere may be expressed more densely, and image information and depth information far from the center of the sphere may be expressed relatively sparsely. In the meantime, when the uniform scale space like the first embodiment 2310 is expressed by using the syntax and semantics in Table 2, the distance of the radial direction increases linearly in the spherical coordinate system (i.e., the value of radial_distance_scale_type is 0) and the linear scale value (i.e., the value of linear_scale_value) is 1.

Figure 24:
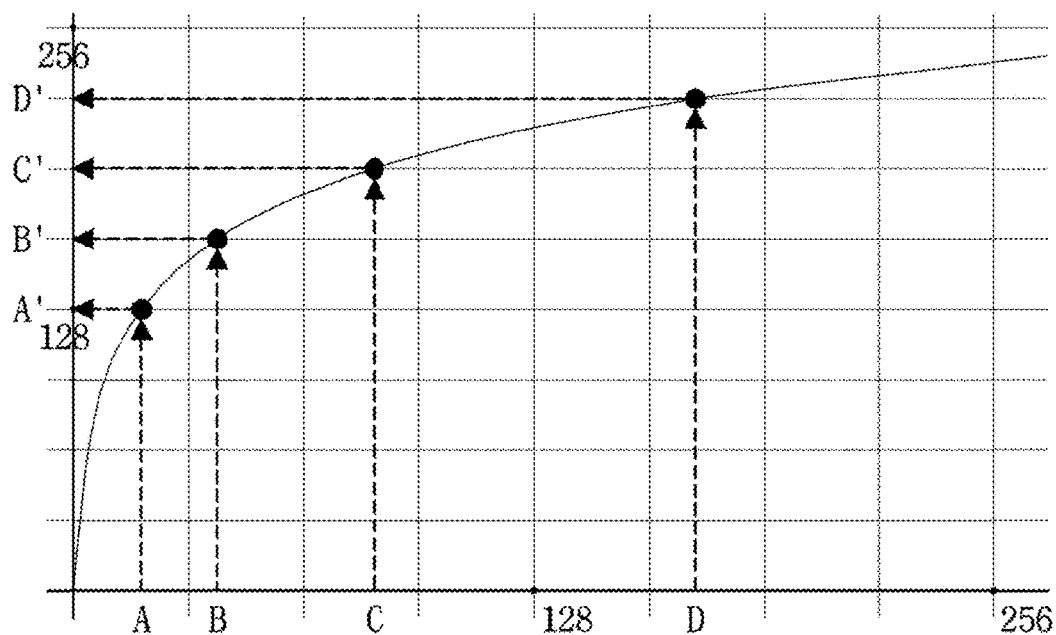
FIG. 24 is a diagram illustrating an example of transforming a uniform scale distance into a logarithmic scale distance according to an embodiment of the present disclosure.

A second embodiment 2320 is an embodiment in which the uniform scale space like the first embodiment 2310 is transformed into logarithmic scale space where the distance increases with logarithmic scale in the radial direction from the center of the sphere. FIG. 24 is a diagram illustrating an example of transforming a uniform scale distance into a logarithmic scale distance according to an embodiment of the present disclosure. By using a logarithmic function (e.g., $d'=\log_a (d)$) and the inverse function (e.g., $d=a^{d'}$), transformation between radii A, B, C, and D of the spheres in the first embodiment 2310 and radii A', B', C', and D' in the corresponding second embodiment 2320, and inverse transformation are possible.

Like the second embodiment 2320, when expressing the distance in the radial direction with logarithmic scale, the image in space considerably far from the center of the sphere is expressed by limiting to a small region, compared to the first embodiment 2310, and the surface of the sphere is expressed with a smaller number of pixels. Therefore, the method in the second embodiment 2320 may be advantageous in expressing image information and depth information with high resolution when being close to the center of the sphere, and in expressing image information and depth information with low resolution when being far from the center of the sphere. Particularly, like the second embodiment 2320, uniform spacing between two adjacent spheres (i.e., when the value of uniform_radius_spacing_flag in Table 2 is 1) results in simplification of information expression and processing operation.

Figure 25:
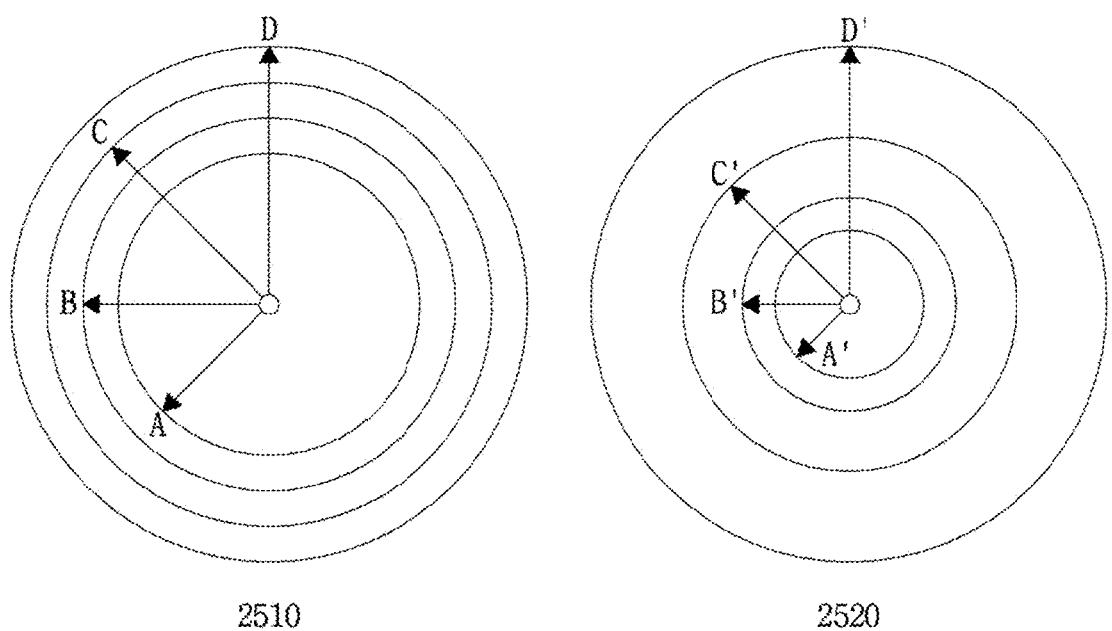
FIG. 25 is a diagram illustrating examples of four-layered spheres expressed in uniform scale space and in exponential scale space according to an embodiment of the present disclosure.

FIG. 25 is a diagram illustrating examples of four-layered spheres expressed in uniform scale space and in exponential scale space according to an embodiment of the present disclosure.

A third embodiment 2510 is an embodiment in which spheres of four layers have different radii A, B, C, and D in uniform scale space where a distance ratio in actual three-dimensional space remains the same in the spherical coordinate system.

Figure 26:
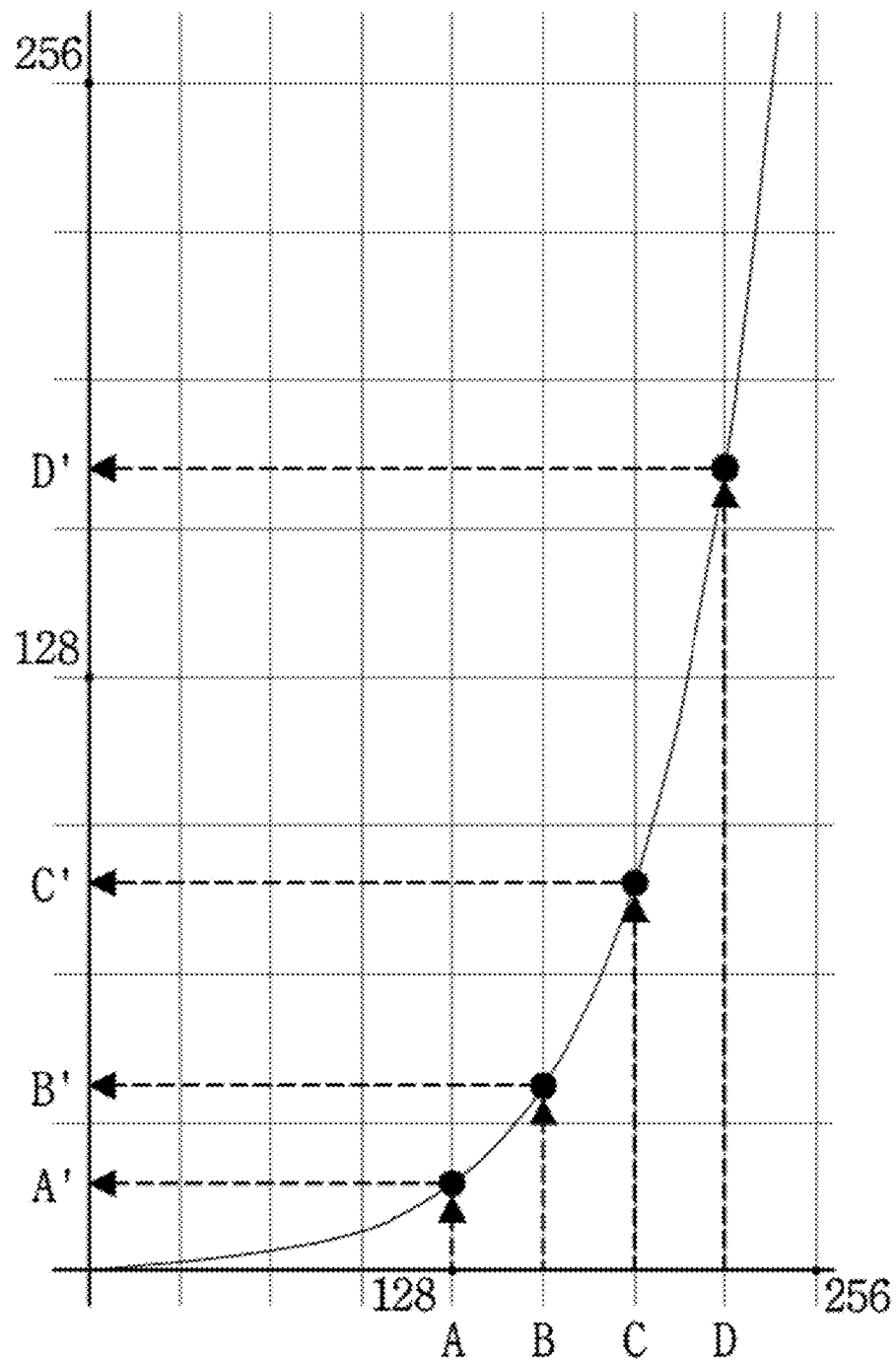
FIG. 26 is a diagram illustrating an example of transforming a uniform scale distance into an exponential scale distance according to an embodiment of the present disclosure.

A fourth embodiment 2520 is an embodiment in which the uniform scale space like the third embodiment 2510 is transformed into exponential scale space where the distance increases with exponential scale in the radial direction from the center of the sphere. FIG. 26 is a diagram illustrating an example of transforming a uniform scale distance into an exponential scale distance according to an embodiment of the present disclosure. By using an exponential function (e.g., $d'=a^d$) and the inverse function (e.g., $d=\log_a (d')$), transformation between radii A, B, C, and D of the spheres in the third embodiment 2510 and radii A', B', C', and D' in the corresponding fourth embodiment 2520, and inverse transformation are possible.

Like the fourth embodiment 2520, when expressing the distance in the radial direction with exponential scale, the spacing between spheres is densely expressed in the direction of the center of the sphere, compared to the third embodiment 2510. For example, when the value of the radius D of the sphere in the third embodiment 2510 is set to be the same as the value of the radius D' of the sphere in the fourth embodiment 2520, radii C, B, and A of the spheres in the third embodiment 2510 is expressed in such a manner that the radius of the sphere decreases in the direction of the center of the sphere in exponential scale space, such as radii C', B', and A' in the fourth embodiment 2520.

In the meantime, according to the method of expressing the image information and the depth information on the basis of the three-dimensional sphere, a cube, a cuboid, a cylinder, etc. may be used instead of a sphere. When using the three-dimensional figure, image information and depth information are expressed in the same or similar manner as in the sphere.

Also, the image information or the depth information expressed on the basis of the three-dimensional sphere may be used in various image processing operations, such as storage, transmission, encoding, decoding, reception, transformation, playing or rendering, etc. according to the purpose of the processing apparatus.

Also, in addition to the image information and the depth information, various pieces of parameter information, such as visible direction information, the number of spheres, the size of each sphere, distance scale information, a projection manner to a two-dimensional plane, etc., may be used.

According to the present disclosure, the image processing apparatus and method relating to the omni-directional video may be provided.

Also, according to the present disclosure, the apparatus and method of expressing the image information and the depth information of the omni-directional video, such as the 360-degree image, the light field image, the point cloud image, etc. in three-dimensional space may be provided.

Also, according to the present disclosure, the apparatus and method of transforming the image information and the depth information of the omni-directional video expressed in three-dimensional space and expressing the result on the two-dimensional plane, and performing inverse transformation thereon may be provided.

Also, according to the present disclosure, the apparatus and method of reconstructing the image by minimizing loss of image information that corresponds to the moved view when the user viewing the omni-directional video moves for viewing may be provided.

Also, according to the present disclosure, the apparatus and method of supporting six degrees of freedom view by overcoming a constraint that on only three degrees of freedom view is supported in the conventional method of expressing the 360-degree video may be provided.

In the above-described embodiments, the methods are described based on the flowcharts with a series of steps or units, but the present invention is not limited to the order of the steps, and rather, some steps may be performed simultaneously or in different order with other steps. It should be appreciated by one of ordinary skill in the art that the steps in the flowcharts do not exclude each other and that other steps may be added to the flowcharts or some of the steps may be deleted from the flowcharts without influencing the scope of the present invention.

Further, the above-described embodiments include various aspects of examples. Although all possible combinations to represent various aspects cannot be described, it may be appreciated by those skilled in the art that any other combination may be possible. Accordingly, the present invention includes all other changes, modifications, and variations belonging to the following claims.

The embodiments of the present invention can be implemented in a form of executable program command through a variety of computer means recordable to computer readable media. The computer readable media may include solely or in combination, program commands, data files and data structures. The program commands recorded to the media may be components specially designed for the present invention or may be usable to a skilled person in a field of computer software. Computer readable recording media includes magnetic media such as hard disk, floppy disk, magnetic tape, optical media such as CD-ROM and DVD, magneto-optical media such as floptical disk and hardware devices such as ROM, RAM and flash memory specially designed to store and carry out programs. Program commands include not only a machine language code made by a complier but also a high level code that can be used by an interpreter etc., which is executed by a computer. The aforementioned hardware device can work as more than a software module to perform the action of the present invention and they can do the same in the opposite case.

While the invention has been shown and described with respect to the preferred embodiments, it will be understood by those skilled in the art that various changes and modification may be made without departing from the spirit and scope of the invention as defined in the following claims.

Accordingly, the thought of the present invention must not be confined to the explained embodiments, and the following patent claims as well as everything including variations equal or equivalent to the patent claims pertain to the category of the thought of the present invention.

What is claimed is:
1. An image processing method comprising:
  obtaining at least one of image information and depth information of an omni-directional video; and
  mapping the obtained information to a three-dimensional coordinate system based on a particular three-dimensional figure, wherein when the obtained information is the depth information of the omni-directional video, the depth information is represented to a distance information having at least one of a first direction which is a center direction of the three-dimensional coordinate system and a second direction which is opposite to the first direction, wherein the three-dimensional figure includes a first three-dimensional figure and a second three-dimensional figure, the second three-dimensional figure is inside the first three-dimensional figure, wherein the mapping the obtained information to a three-dimensional coordinate system comprises mapping the obtained information to one of the first three-dimensional coordinate system based on the first three-dimensional figure and the second three-dimensional coordinate system based on the second three-dimensional figure; and mapping the obtained information to the first three-dimensional coordinate system based on the first three-dimensional figure and the second three-dimensional coordinate system based on the second three-dimensional figure when a subject region is present across the first three-dimensional figure and the second three-dimensional figure.

2. The method of claim 1, wherein the three-dimensional figure is at least one of a sphere, a cube, a cuboid, and a cylinder.

3. The method of claim 1, wherein when the three-dimensional figure is a sphere, the three-dimensional coordinate system based on the particular three-dimensional figure is a spherical coordinate system.

4. The method of claim 3, further comprising:
mapping the image information to a pixel value on a surface of the spherical coordinate system when the obtained information is the image information of the omni-directional video.

5. The method of claim 3, further comprising:
mapping the depth information to a distance in an inward direction or an outward direction from a surface of the spherical coordinate system when the obtained information is the depth information of the omni-directional video.

6. The method of claim 1, further comprising:
mapping the obtained information to multiple three-dimensional coordinate systems based on a particular three-dimensional figure.

7. The method of claim 6, further comprising:
mapping the obtained information to a multilayered spherical coordinate system when the three-dimensional figure is a sphere.

8. The method of claim 7, further comprising:
transforming the information mapped to the multilayered spherical coordinate system into information on a two-dimensional plane; and
generating a common projection format by using the transformed information.

9. The method of claim 7, further comprising:
based on the obtained information, setting different spacing between spherical coordinate systems that are at least part of the multilayered spherical coordinate system.

10. The method of claim 1, further comprising:
obtaining parameter information of the omni-directional video.

11. The method of claim 10, wherein when the three-dimensional coordinate system based on the particular three-dimensional figure is a multilayered spherical coordinate system, the parameter information is at least one selected from a group of the image information, the depth information, visible direction information, a number of spheres constituting the multilayered spherical coordinate system, a size of a sphere, distance scale information, and a projection manner to a two-dimensional plane.

12. An image processing apparatus configured to:
obtain at least one of image information and depth information of an omni-directional video; and
map the obtained information to a three-dimensional coordinate system based on a particular three-dimensional figure, wherein when the obtained information is the depth information of the omni-directional video, the depth information is represented to a distance information having at least one of a first direction which is a center direction of the three-dimensional coordinate system and a second direction which is opposite to the first direction, wherein the three-dimensional figure includes a first three-dimensional figure and a second three-dimensional figure, the second three-dimensional figure is inside the first three-dimensional figure, wherein the mapping the obtained information to a three-dimensional coordinate system comprises mapping the obtained information to one of the first three-dimensional coordinate system based on the first three-dimensional figure and the second three-dimensional coordinate system based on the second three-dimensional figure; and mapping the obtained information to the first three-dimensional coordinate system based on the first three-dimensional figure and the second three-dimensional coordinate system based on the second three-dimensional figure when a subject region is present across the first three-dimensional figure and the second three-dimensional figure.

13. The apparatus of claim 12, wherein the three-dimensional figure is at least one of a sphere, a cube, a cuboid, and a cylinder.

14. The apparatus of claim 12, wherein when the three-dimensional figure is a sphere, the three-dimensional coordinate system based on the particular three-dimensional figure is a spherical coordinate system.

15. The apparatus of claim 14, wherein when the obtained information is the image information of the omni-directional video, the image information is mapped to a pixel value on a surface of the spherical coordinate system.

16. The apparatus of claim 14, wherein when the obtained information is the depth information of the omni-directional video, the depth information is mapped to a distance in an inward direction or an outward direction from a surface of the spherical coordinate system.

17. The apparatus of claim 12, wherein the obtained information is mapped to multiple three-dimensional coordinate systems based on a particular three-dimensional figure.

18. The apparatus of claim 17, wherein when the three-dimensional figure is a sphere, the obtained information is mapped to a multilayered spherical coordinate system.

19. The apparatus of claim 18, wherein the information mapped to the multilayered spherical coordinate system is transformed into information on a two-dimensional plane, and a common projection format is generated by using the transformed information.

20. The apparatus of claim 12, wherein parameter information of the omni-directional video is obtained, and
when the three-dimensional coordinate system based on the particular three-dimensional figure is a multilayered spherical coordinate system, the parameter information is at least one selected from a group of the image information, the depth information, visible direction information, a number of spheres constituting the multilayered spherical coordinate system, a size of a sphere, distance scale information, and a projection manner to a two-dimensional plane.

\* \* \* \* \*